United States Patent
Panz et al.

(10) Patent No.: US 9,738,535 B2
(45) Date of Patent: Aug. 22, 2017

(54) PRECIPITATED SILICAS FOR STORAGE-STABLE RTV-1 SILICONE RUBBER FORMULATIONS WITHOUT STABILIZER

(75) Inventors: Christian Panz, Wesseling-Berzdorf (DE); Helga Obladen, Bruehl (DE); Karl Meier, Alfter (DE); Markus Ruf, Alfter-Witterschlick (DE); Rene Allerdisse, Bornheim (DE); Dieter Kuhn, Rodenbach (DE); Aziz El Moussaoui, Gelnhausen-Hoechst (DE); Mario Scholz, Gruendau (DE); Michael Kempf, Rodenbach (DE)

(73) Assignee: Evonik Degussa GmbH, Essen (DE)

( * ) Notice: Subject to any disclaimer, the term of this patent is extended or adjusted under 35 U.S.C. 154(b) by 1037 days.

(21) Appl. No.: 12/262,684

(22) Filed: Oct. 31, 2008

(65) Prior Publication Data

US 2009/0137732 A1    May 28, 2009

Related U.S. Application Data

(60) Provisional application No. 60/985,809, filed on Nov. 6, 2007.

(30) Foreign Application Priority Data

Nov. 2, 2007    (DE) .................. 10 2007 052 269

(51) Int. Cl.
    *C01B 33/193*    (2006.01)
    *C09K 3/10*    (2006.01)

(52) U.S. Cl.
    CPC .......... *C01B 33/193* (2013.01); *C09K 3/1018* (2013.01); *C01P 2004/61* (2013.01); *C01P 2004/62* (2013.01); *C01P 2006/10* (2013.01); *C01P 2006/12* (2013.01); *C01P 2006/19* (2013.01)

(58) Field of Classification Search
    USPC ........................................................ 423/335
    See application file for complete search history.

(56) References Cited

U.S. PATENT DOCUMENTS

| | | | |
|---|---|---|---|
| 4,711,928 A * | 12/1987 | Lee et al. ....................... | 524/860 |
| 4,734,479 A * | 3/1988 | Inoue et al. .................... | 528/18 |
| 5,256,196 A | 10/1993 | Chjonowski et al. | |
| 5,276,123 A * | 1/1994 | King et al. ...................... | 528/17 |
| 5,321,070 A | 6/1994 | Meier et al. | |
| 5,851,502 A | 12/1998 | Turk et al. | |
| 6,008,284 A * | 12/1999 | Nylund et al. ................ | 524/425 |
| 6,077,466 A | 6/2000 | Turk et al. | |
| 6,191,122 B1 | 2/2001 | Lux et al. | |
| 6,201,038 B1 * | 3/2001 | Waller et al. ................. | 523/109 |
| 6,846,865 B2 | 1/2005 | Panz et al. | |
| 6,899,951 B2 | 5/2005 | Panz et al. | |
| 6,956,080 B2 | 10/2005 | Scholz et al. | |
| 6,977,065 B1 * | 12/2005 | Esch et al. ..................... | 423/335 |
| 7,022,375 B2 | 4/2006 | Schachtely et al. | |
| 7,074,457 B2 | 7/2006 | Panz et al. | |
| 7,204,969 B2 | 4/2007 | Kuhlmann et al. | |
| 7,220,449 B2 | 5/2007 | Schachtely et al. | |
| 2002/0102198 A1 * | 8/2002 | Kuhlmann et al. ........... | 423/335 |
| 2005/0106091 A1 * | 5/2005 | Shapira et al. ............... | 423/335 |
| 2005/0191228 A1 * | 9/2005 | Panz et al. ..................... | 423/335 |
| 2005/0192395 A1 | 9/2005 | Panz et al. | |
| 2005/0282934 A1 | 12/2005 | Brinkmann et al. | |
| 2006/0165581 A1 | 7/2006 | Stenzel et al. | |
| 2007/0208127 A1 | 9/2007 | Esch et al. | |
| 2007/0286788 A1 * | 12/2007 | Panz et al. ..................... | 423/335 |
| 2007/0299203 A1 | 12/2007 | Panz et al. | |
| 2008/0173739 A1 | 7/2008 | Meier et al. | |
| 2011/0037021 A1 | 2/2011 | Tschernjaew et al. | |
| 2011/0078920 A1 | 4/2011 | Tschernjaew et al. | |
| 2011/0179970 A1 | 7/2011 | Zschunke et al. | |
| 2011/0236288 A1 | 9/2011 | Panz et al. | |
| 2011/0244238 A1 | 10/2011 | Panz et al. | |

FOREIGN PATENT DOCUMENTS

| | | |
|---|---|---|
| DE | 10 2005 005 046 A1 | 8/2006 |
| EP | 1 561 727 A1 | 8/2005 |
| EP | 1 860 067 A1 | 11/2007 |
| TW | 200508151 | 3/2005 |
| TW | 200530128 | 9/2005 |
| TW | 200817281 | 4/2008 |

OTHER PUBLICATIONS

U.S. Appl. No. 11/944,851, filed Nov. 26, 2007, Panz, et al.
U.S. Appl. No. 60/021,601, filed Jul. 11, 1996, Oelmueller, et al.
U.S. Appl. No. 09/447,044, filed Nov. 23, 1999, Turk, et al.
U.S. Appl. No. 08/683,342, filed Jul. 18, 1996, Rausch, et al.
U.S. Appl. No. 60/940,615, filed May 29, 2007, Meier, et al.
U.S. Appl. No. 60/985,809, filed Nov. 6, 2007, Panz, et al.
U.S. Appl. No. 13/202,512, filed Aug. 19, 2011, Stenner, et al.
Office Action issued Oct. 1, 2013 in Taiwanese Patent Application No. 097141598 (submitting English translation only).

* cited by examiner

*Primary Examiner* — Melvin C Mayes
(74) *Attorney, Agent, or Firm* — Oblon, McClelland, Maier & Neustadt, L.L.P.

(57) ABSTRACT

A precipitated silica having an $SiOH_{isolated}$ absorbance ratio of greater than or equal to 1.5, a silanol group density of 1 to 3.0 $SiOH/nm^2$, a modified tapped density of 1 to 50 g/l, and a pH of 3-5, when measured as a aqueous suspension of 5.00 g of the precipitated silica in 100 ml. of deionized water allows preparation of storage-stable RTV-1 silicone rubber formulations without stabilizer. A process for preparing the precipitated silica and its use in thickening sealants is provided.

24 Claims, 6 Drawing Sheets

PRECIPITATED SILICAS FOR STORAGE-STABLE RTV-1 SILICONE RUBBER FORMULATIONS WITHOUT STABILIZER

CROSS-REFERENCE TO RELATED APPLICATIONS

This application claims priority to German Application No. 102007052269.1, filed Nov. 2, 2007, and U.S. Provisional Patent Application No. 60/985,809, filed Nov. 6, 2007, the disclosures of which are incorporated herein by reference in their entireties.

FIELD OF THE INVENTION

The present invention relates to precipitated silicas for storage-stable RTV-1 silicone rubber formulations without stabilizer, to a process for preparing them and to their use for thickening sealants.

BACKGROUND OF THE INVENTION

Sealants are elastic substances that are applied in liquid to highly viscous form for the sealing of buildings or installations against water, atmospheric influence or aggressive media.

Silicone rubbers are compositions which are convertible into the elastomeric state and comprise as their base polymers polydiorganosiloxanes containing groups amenable to crosslinking reactions. Suitable such groups include, predominantly, H atoms, OH groups and vinyl groups, which may be located at the chain ends, or else may be incorporated in the chain. Incorporated in this system are fillers as reinforcers, their nature and amount significantly influencing the mechanical and chemical behavior of the vulcanizates. Silicone rubbers can be colored with inorganic pigments. A distinction is made between high-temperature vulcanizing and room-temperature vulcanizing (HTV/RTV) silicone rubbers.

Among the room-temperature curing or vulcanizing silicone rubber compositions, it is possible to differentiate one-component (1K) and two-component (2K) systems. The first group (RTV-1K) polymerizes slowly at room temperature under the influence of atmospheric moisture, with crosslinking taking place through condensation of SiOH groups to form SiO bonds. The SiOH groups are formed by hydrolysis of SiX groups of a species formed as an intermediate from a polymer with terminal OH groups and from what is called a crosslinker R-SiX$_3$ (e.g. X=—O—CO—CH$_3$, —NHR). In two-component rubbers (RTV-2K) the crosslinkers used are, for example, mixtures of silicic esters (e.g. ethyl silicate) and organotin compounds, the crosslinking reaction that takes place being the formation of an Si—O—Si bridge from ≡Si—OR and ≡Si—OH (R=methyl group; R=organic radical) by elimination of alcohol.

The thickeners used for RTV-1K silicone rubber include silicas. In view of the sensitivity to hydrolysis of the silicone sealants, these silicas must introduce as little moisture as possible into the system. For this reason, fumed silicas have been used almost exclusively to date for this application. Hydrophilic precipitated silicas have not been used to date, on account of their high moisture content.

DISCUSSION OF THE BACKGROUND

WO 2005/061384 discloses the preparation and use—including use in silicone rubber—of precipitated silicas which according to the claim have a water absorption of <6% and a DOP>300 ml/100 g. The precipitated silicas disclosed in the examples of WO 2005/061384, however, all have a water absorption of between 5.7% and 5.9% and are therefore unsuitable, for the reasons given above, for use in RTV-1K formulations. Accordingly, WO 2005/061384 describes only their use in silicone rubber formulations for extrusion processes (HTV).

EP 1557446 describes exclusively HTV silicone rubber formulations. The precipitated silicas employed therein have a loss on drying of <4%. The formulations disclosed in EP 1557446 are used for producing insulating materials such as cable sheathing, for example.

In summary, therefore, it can be stated that the background art cited above does not disclose any precipitated silicas which meet the exacting requirements for use in RTV-1K silicone rubber. There is therefore a strong need for precipitated silicas of this kind that are suitable for RTV-1K applications.

To solve the aforementioned problem DE 102006024591 and DE 102006024590 proposed precipitated silicas suitable for RTV-1K silicone rubber formulations. A disadvantage of the precipitated silicas disclosed therein, however, is that in order to obtain good storage stability on the part of the RTV-1K formulations it is necessary to add a stabilizer and relatively large quantities of crosslinker.

DETAILED DESCRIPTION OF THE INVENTION

Figure 1:
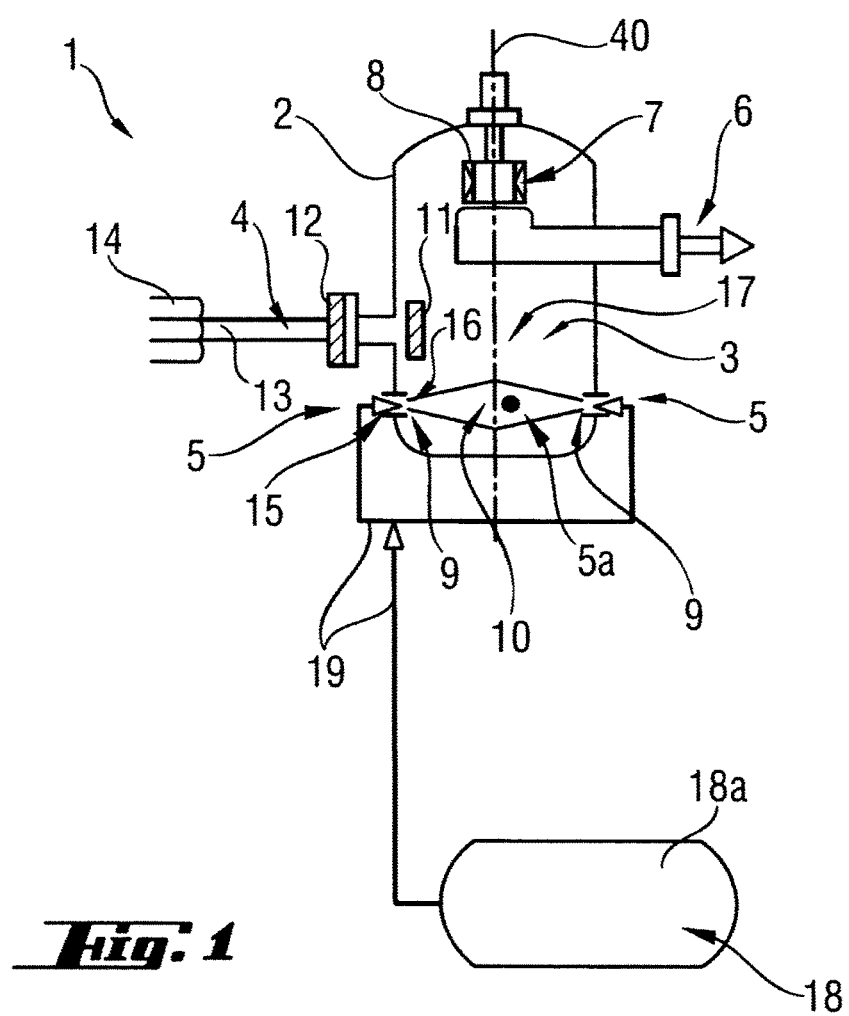
FIG. 1 shows, in the form of a diagram, a working example of a jet mill in a partly cutaway schematic drawing.

On the basis of the conventional art described above, the object of the present invention is to provide precipitated silicas from which the above-mentioned disadvantages of the precipitated silicas have been completely or at least partially eliminated. A further object is to provide a process for preparing the precipitated silicas of the invention.

Further objects, not explicitly stated, will emerge from the overall context of the description, examples and claims.

Surprisingly, this and other objects have been achieved by the present invention the first embodiment of which includes the precipitated silicas that are defined in greater detail in the description below and also in the claims and in the examples.

In a first embodiment, the present invention provides precipitated silicas having an SiOH$_{isolated}$ absorbance ratio of greater than or equal to 1.5, a silanol group density of 1 to 3.0 SiOH/nm$^2$ and a modified tapped density of 1 to 50 g/l, and are characterized in that the pH of the precipitated silica is in the range of 3-5.

In further embodiments, the invention provides precipitated silicas, preferably hydrophilic precipitated silicas, which in addition to the stated parameters, independently of one another, have one or more of the following physicochemical parameters:

| | |
|---|---|
| BET surface area | 50-600 m$^2$/g |
| CTAB surface area | 50-350 m$^2$/g |
| DBP (anhydrous) | 150-400 g/100 g |
| loss on ignition | 0.1%-3.0% by weight |
| loss on drying | 0.1%-3.0% by weight |
| fraction of particles <1 µm in the volume-based particle distribution | 5% to 100% |
| d$_{90}$ value of the volume-based particle distribution | 0.001 to 10 µm |

In another embodiment, the present invention further provides a process for preparing the precipitated silicas of the invention as defined in the claims and the description below.

Additional embodiments provided by the present invention include the use of the precipitated silicas of the invention in sealants, especially in silicone rubber and silicone sealants and with particular preference in RTV-1K sealants. Application is possible in different crosslinking systems, e.g. acetoxy-crosslinking, alkoxy-crosslinking and oxime-crosslinking. These systems are employed, for example, in the building industry as joint-sealants, in the automotive industry as adhesives and sealants, and as coating materials for textile fabric, for example.

Further embodiments provide sealants based on silicone rubber which comprise the precipitated silicas of the invention, and their use.

The precipitated silicas of the invention have the advantage that, on the basis of their special structure and surface qualities, they ensure high storage stability, a firm consistency and an optimum yield point of the silicone rubber when incorporated into silicone rubber compositions, especially those of the RTV-1K type, without the silicone rubber formulations containing a stabilizer.

The inventors have surprisingly found out that precipitated silicas having an SiOH$_{isolated}$ absorbance ratio of greater than or equal to 1.5, a silanol group density of 1 to 3.0 SiOH/nm$^2$, and a modified tapped density of 1 to 50 g/l, if they have a pH in the range of 3-5, allow good storage stability on the part of silicone rubber formulations without the addition of a stabilizer.

The precipitated silicas of the invention have the advantage, moreover, that through the specific combination of parameters claimed in Claim 1, the required amount of crosslinker in RTV-1K silicone rubber formulations can be reduced significantly, leading to a notable economic advantage.

In spite of the absence of a stabilizer and the reduction in the amount of crosslinker, RTV-1K formulations comprising the precipitated silicas of the invention feature a high thixotropy. Furthermore, the precipitated silicas of the invention can be dispersed rapidly and effectively into silicone rubber formulations and hence a high thickening action can be achieved in RTV-1K silicone rubber compositions.

Moreover, the precipitated silicas of the invention, being more inexpensive to prepare, offer a substantial cost advantage over the fumed silicas used to date in RTV1 silicone rubber.

In the present invention the terms silica and precipitated silica are used synonymously. By hydrophilic precipitated silicas are meant those whose surface shows hydrophilic behavior when incorporated by stirring into water, i.e. those whose surface is completely wetted by water and therefore have a contact angle with respect to water of less than 90°. The hydrophilic precipitated silicas of the invention preferably have a carbon content of <0.5% by weight.

The silicas of the invention are distinguished by the fact that they have a particularly high proportion of isolated SiOH groups, as expressed by the SiOH$_{isolated}$ absorbance ratio, on their surface. The SiOH$_{isolated}$ absorbance ratio of the silicas of the invention is greater than or equal to 1.5, preferably between 1.5 and 10, more preferably between 1.5 and 7, very preferably between 1.8 and 5, with especial preference between 2 and 4.5, with very special preference between 2.3 and 4.0 and with particular preference between 2.3 and 3.5. This particular surface quality of the precipitated silicas of the invention is an important property, and as a result of this property, silicone rubber formulations containing the precipitated silicas according to the claimed invention, have a high level of storage stability, improved firmness of consistency, and an optimized flow behavior.

Furthermore, the precipitated silicas of the invention are distinguished by a low silanol group density, i.e. a wide spacing of the silanol groups on the precipitated silica surface. For the determination of the silanol group density, the number of silanol groups on the surface of the precipitated silica is first determined by means of LiAlH$_4$. This alone, however, is not meaningful, since precipitated silicas with a high surface area generally have a higher absolute number of silanol groups than do precipitated silicas with a low surface area. Consequently it is necessary to relate the number of silanol groups to the surface area of the precipitated silica. A suitable measurement of surface area for this purpose is the BET surface area, since this describes the surface area which is available even to relatively small molecules such as water, for example. The silanol group density of the precipitated silicas of the invention is in the range from 1.0 to 3.0 SiOH/nm$^2$, preferably from 1.0 to 2.8 SiOH/nm, more preferably from 1.5 to 2.8 SiOH/nm$^2$. If the number of silanol groups per nm$^2$ is too low, an excessively low yield point may result and may consequently have an adverse effect on the consistency of the silicone sealants.

Moreover, the precipitated silicas of the invention have a low modified tapped density. It should be noted here that the modified tapped density is a reference to the tapped density as measured on the uncompacted material. In order to be able to determine this variable even on materials which have already undergone preliminary compaction as a result of packaging and storage, it is necessary to carry out sample preparation as described in the section "Determining the modified tapped density". The precipitated silicas of the invention preferably have a modified tapped density of 1 to 50 g/l, more preferably of 5 to 55 g/l, very preferably of 10 to 50 g/l, and with particular preference of 10 to 30 g/l.

The precipitated silicas of the invention are distinguished, finally, by a pH in the range of 3-5, preferably 3.5 to 5, more preferably 4 to 4.7. The low pH of the precipitated silicas of the invention allows omission of a stabilizer when the silicone rubber formulations are formulated, and allows good storage stability to be achieved even without stabilizer.

Without being tied to any specific theory, the special properties of the precipitated silicas of the invention, i.e., the fact that they allow the preparation of storage-stable silicone rubber formulations having outstanding performance properties, such as good consistency and rheology, for example, without addition of stabilizer, may be explained as a result of the high number of isolated SiOH groups of the precipitated silicas in combination with their broad spacing, the low modified tapped density, and, in particular, the low pH. Furthermore, this specific combination of physicochemical properties on the part of the precipitated silicas of the invention means that, when the silicas of the invention are used as a filler in silicone rubber formulations, only small amounts of crosslinker are needed for the formulation.

The specific BET surface area describes the effect of the silica on the incorporation characteristics into silicone rubber and also on the crude mixing properties (cf. S. Brunauer, P. H. Emmett, E. Teller, "Adsorption of Gases in Multimolecular Layers", J. Am. Chem. Soc. 60, 309 (1938)). Thus the precipitated silicas of the invention may have a BET surface area of 50 to 600 $m^2/g$, preferably 50 to 400 $m^2/g$, more preferably 50 to 250 $m^2/g$, very preferably 80 to 230 $m^2/g$, especially preferably of 100 to 180 $m^2/g$, more especially preferably of 125 to 180 $m^2/g$, and, with more particular preference, of 140 to 170 $m^2/g$.

The specific CTAB surface area may be of decisive importance primarily for the reinforcing property of the silica (cf. Janzen, Kraus, Rubber Chem. Technol. 44, 1287 (1971)). The reinforcing potential increases with increasing CTAB surface area. Thus the precipitated silicas of the invention may have a CTAB surface area of 50 to 350 $m^2/g$, more preferably 50 to 250 $m^2/g$, very preferably of 80 to 230 $m^2/g$, especially preferably of 100 to 200 $m^2/g$, and very especially preferably of 125 to 190 $m^2/g$.

It has additionally been found that a high DBP absorption on the part of the precipitated silicas of the invention may be of benefit in order to obtain effective rheological properties in the silicone rubber formulations. Excessively high DBP values, however, may lead to an excessive increase in the viscosity of the silicone rubber and ought therefore to be avoided. The precipitated silicas of the invention, accordingly, preferably have a DBP absorption of 150 to 400 g/(100 g), more preferably 200 to 350 g/(100 g), very preferably of 220 to 330 g/(100 g), especially preferably of 250 to 330 g/(100 g), and very especially preferably of 260 to 320 g/(100 g).

The inventors have observed, moreover, that for the consistency of the silicone sealants it may be of particular advantage if the precipitated silicas of the invention contain a sufficient fraction of fine particles, i.e. of particles <1 µm. This applies to all of the embodiments described above. Therefore, a fine particle fraction of particles in the particle size range <1 µm of the volume-based particle distribution of the precipitated silicas of the invention may be 30% to 100%, preferably 30% to 95%, more preferably 35% to 95%, very preferably 35% to 90%, especially preferably 40% to 90%, with especial preference 45% to 80%, and, with more particular preference, of 50% to 80%.

It has also been observed that an excessive fraction of coarse particles may adversely affect the performance properties of the precipitated silicas of the invention. For this reason, the precipitated silicas of the invention may preferably be distinguished by a $d_{90}$ value, relative to the volume-based particle distribution curve, of between 0.001 and 10 µm, preferably between 1 and 10 µm, more preferably between 2 and 8 µm and with particular preference between 3 and 7 µm.

The particle distributions may be monomodal or bimodal, preferably bimodal.

It has also been observed that for all of the above-described embodiments of the silicas of the invention it may be of particular advantage if from the outset the precipitated silica introduces very little moisture into the silicone sealant. The precipitated silicas of the invention may therefore have an initial moisture content, expressed by the loss on drying, of 0.1% to 3.0%, preferably 0.2% to 2.5%, more preferably 0.3% to 2.0%, and with particular preference 0.4% to 1.8% by weight and/or a loss on ignition of 0.1%-3.0%, preferably 0.2% to 3.0%, more preferably 0.3% to 2.0%, and with particular preference 0.4% to 1.8% by weight.

The stated ranges of preference may be set independently of one another.

The precipitated silicas of the invention may be prepared by a process which comprises:
1) reacting at least one silicate with at least one acidifier;
2) filtering and washing the resulting precipitated silica;
3) drying the resulting precipitated silica or filtercake;
4) optionally grinding the precipitated silica obtained after drying;
5) heat-treating the dried and/or ground precipitated silica; and
6) optionally grinding the precipitated silica obtained after heat treating;
and which is characterized in that after 3) and/or 4) and/or 5) and/or 6) at least one acidifier is added such that the precipitated silica obtained at the end of the process has a pH of 3-5.

The reacting in 1) here preferably comprises:
1a) preparing an initial charge of water or of water and at least one silicate and/or a silicate solution, the pH of the resulting initial charge being preferably between 5 and 10 and the temperature of the initial charge being preferably between 80 and 100° C.;
1b) metering at least one silicate and/or a silicate solution and at least one acidifier into the initial charge from 1a) with stirring at 80 to 100° C. until the solids content of the precipitation suspension reaches a level which leads to the solids content which is to be reached in 1c) (With particular preference, silicate and/or silicate solution and acidifier are added simultaneously and/or in such a way that the pH for the period of 1b) is kept constant at a level between 7 and 10.);
1c) adding an acidifier at a temperature of the precipitation suspension of 80 to 100° C., so that the pH of the precipitation suspension is lowered to 2 to 6 and the final solids content of the precipitation suspension is between 30 and 70 g/l.

Preferably the precipitated silicas of the invention are ground. This takes place with particular preference by grinding the precipitated silicas of the invention in 4), i.e. between 3) and 5), or in 6), i.e. after 5), or both in 4), i.e. between 3) and 5), and in 6), i.e. after 5).

All known forms of silicate are suitable for the silicates or silicate solutions used in step 1) of the process of the invention. The silicates used in accordance with the invention may preferably be alkaline silicates, e.g. sodium or potassium silicates. With particular preference the silicate in step 1 may be sodium silicate (waterglass). Its weight ratio of $SiO_2$ to $Na_2O$ may be between 2 and 4, preferably between 3 and 3.6 and more preferably between 3.3 and 3.5. The $SiO_2$ content may be between 20% and 40% by weight, preferably between 25% and 35% by weight and more preferably between 25% and 30% by weight.

Acidifiers are acidic compounds of organic or inorganic type which can be used to lower the pH of the precipitation suspension. With preference it may be possible to use inorganic acids such as hydrochloric acid, phosphoric acid, sulfuric acid or nitric acid, or organic acids such as acetic acid, formic acid or carbonic acid or carbon dioxide. Both dilute and concentrated acids may be used. With particular preference the process of the invention uses sulfuric acid.

In the majority of cases the silicate and/or the silicate solution and acidifier used in 1a) to 1c) may be identical.

The pH of the initial charge in 1a) may preferably be between 7 and 10, more preferably between 8 and 9. The temperature of the initial charge may be set at 80 to 100° C., preferably at 85 to 95° C., In 1b) silicate and acidifier may be preferably metered in simultaneously. The addition of the two components preferably takes place continuously and constantly over the entire period of 1b). During this period the temperature remains at 80 to 100° C., preferably at 85 to 95° C. The period of the addition lasts until the solids content to be achieved at the end of 1c) has been achieved. It may in this case be necessary to continue the precipitation beyond the viscosity rise point. This viscosity rise point corresponds to the point in time at which a sharp rise is observed in the viscosity of the precipitation suspension in the course of precipitation; cf. EP 0643015. During 1b), in which the precipitation of the silica begins, the pH may be as far as possible kept constantly at a level of between 7 and 10, preferably constant at a level of between 7.5 and 9.5 and with very particular preference at a pH of between 8 and 9. Corrections to an off-target pH may be generally made by increasing or lowering the addition of the acidifier, so that the set pH preferably fluctuates only by ±0.2 pH units, more preferably by only ±0.1 pH units.

Through addition of an acidifier at a temperature of the precipitation suspension of 80 to 100° C. its pH is lowered in 1c) to 2 to 6, preferably 3 to 6, more preferably to 3 to 4. The solids content of the precipitation suspension at the end of this substep may be between 30 and 70 g/l, preferably between 45 and 60 g/l and with very particular preference between 45 and 55 g/l.

Without in any way being tied to one particular theory, the intention is that, by suitable choice of the process parameters, a chain-like structure of the aggregates should be constructed in 1b). A reinforcement of this hitherto quite loose aggregate structure may be attained by the correspondingly slow further precipitation even after the viscosity rise point.

The metering rates in 1b) may be selected in all embodiments of the process of the invention, both before and after the viscosity rise point, such that the solids content which is to be achieved after acidification in 1c), of 30 to 70 g/l, may be reached.

The filtration, liquefaction (e.g. in accordance with DE 2447613) and extended or accelerated drying of the precipitated silicas of the invention are familiar to the person skilled in the art and can be looked up, for example, in the documents cited in the description. The filtration and the washing of the precipitated silica take place preferably in such a way that the conductivity of the end product is <1000 μS/cm, preferably <500 μS/cm and more preferably <200 μS/cm.

The precipitated silica of the invention may be dried preferably in a pneumatic conveying drier, spray drier, rack drier, belt drier, rotary tube drier, flash drier, spin-flash drier or nozzle tower drier. These drying variants include operation with an atomizer, with a single-fluid or two-fluid nozzle or with an integrated fluid bed. Spray drying may be carried out in accordance for example with U.S. Pat. No. 4,094,771.

If the selected mode of drying is spray drying, which may be particularly preferred, then the filtercake should be redispersed beforehand. Redispersion may take place preferably in water or aqueous acid so that the dispersion has a pH of 4 to 7. It should be ensured here that the silica dispersion when redispersion is at an end has a solids content of 5% to 18%, preferably 8% to 13% by weight, more preferably 9% to 11%, and that in the course of redispersion the shearing forces acting on the precipitated silica are not too great. This can be achieved, for example, by stirring with a rotary speed of <1000 rpm, with preferably generalized rather than localized stirring. The redispersed precipitated silica dispersion may be metered into the spray drier preferably such that the temperature at the drier exit is from 100 to 170° C., preferably 120 to 160° C., and more preferably 130-160° C.

The grinding of the precipitated silicas of the invention may take place for example as described in Ullmann, 5th edition, B2, 5-20. Preferably the grinding of the precipitated silicas of the invention takes place in 4) and/or in 6), very preferably in 4). For this purpose it may be preferred in particular to use a grinding system (grinding apparatus) comprising or consisting of impact mills or jet mills, preferably opposed-jet mills. Particular preference may be given to using fluid-bed opposed-jet mills. With very particular preference, grinding takes place by means of a grinding system (grinding apparatus), with particular preference a grinding system comprising a jet mill, characterized in that the mill of the grinding system may be operated in the grinding phase with an operational medium selected from the group consisting of gas and/or vapor, preferably steam, and/or a gas comprising steam, and in that the grinding chamber may be heated in a heating phase, i.e. before the actual operation with the operational medium, such that the temperature in the grinding chamber and/or at the mill outlet is higher than the dew point of the vapor and/or operational medium.

Grinding takes place with particular preference in accordance with the method described in DE 10 2006 048 850.4, using the grinding system (mill) described therein, the operational medium used being, with especial preference, steam. In order to avoid pure repetitions of text, the content of the cited patent is hereby explicitly incorporated by reference in its entirety as part of the content of the present specification. The grinding parameters are preferably chosen such that the ground product may have a fine-particle fraction, in the region smaller than 1 μm of the volume-based particle distribution, of 5% to 100%, preferably 10% to 95%, more preferably 15% to 95%, with very particular preference 20% to 90%, and with particular preference, of 40% to 80%, and/or a $d_{90}$ value in the volume-based particle distribution curve of between 0.001 and 10 μm.

Figure 2:
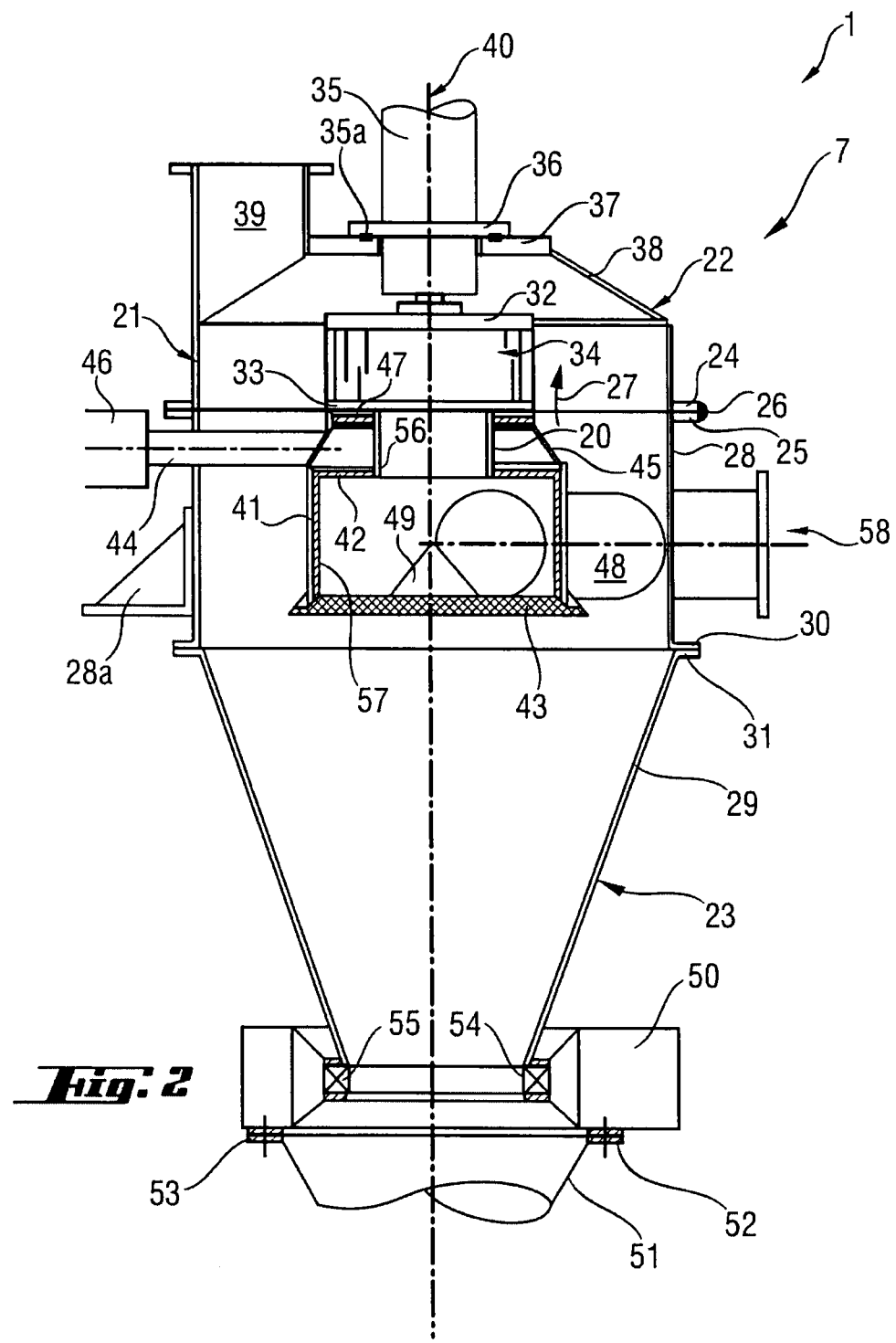
FIG. 2 shows a working example of a pneumatic classifier of a jet mill in vertical arrangement and as a schematic middle longitudinal section, the outlet pipe for the mixture of classifying air and solid particles being coordinated with the classifying wheel.
Figure 2A:
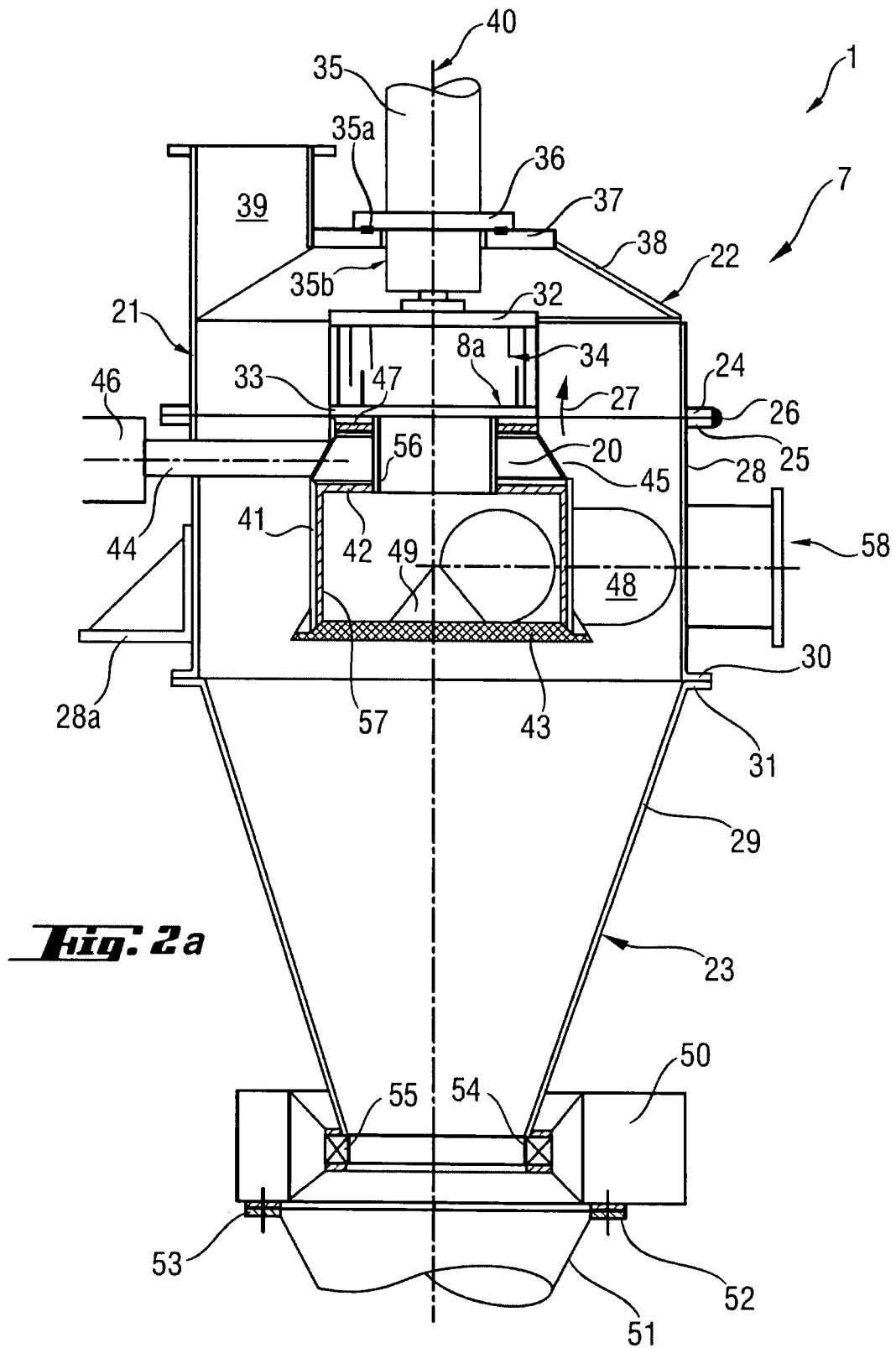
FIG. 2a shows a working example of a pneumatic classifier analogous to FIG. 2 but with flushing of classifier gap 8a and shaft lead-through 35b.

In one especially preferred embodiment, in preparation for actual grinding with superheated steam, a fluid-bed opposed-jet mill as shown in FIG. 1, with an integrated dynamic pneumatic classifier as shown in FIGS. 2 and 2a, is first heated via the two heating nozzles (5a) (of which only one is depicted in FIG. 1) which are charged with hot compressed air, preferably at 10 bar and 160° C., until the mill exit temperature is higher than the dew point of the vapor and/or operational medium, preferably about 105° C.

Connected downstream of the mill, for the separation of the ground material, is a filter system (not shown in FIG. 1) whose filter housing is heated in its lower third indirectly, via attached heating coils, by means of saturated steam (preferably 6 bar saturated steam), likewise for the purpose of preventing condensation. All of the apparatus surfaces in the region of the mill, the separation filter, and the supply lines for steam and hot compressed air have special insulation.

After the desired heating temperature has been reached, the supply of hot compressed air to the heating nozzles is shut off and the charging of the three grinding nozzles with superheated steam, preferably at 38 bar (abs) and 325° C., is commenced.

In order to protect the filter medium used in the separation filter and also in order to set a defined level of residual water in the ground material, of preferably 2% to 6%, water is introduced in the starting phase, and during grinding, into the grinding chamber of the mill, via a two-fluid nozzle operated with compressed air, as a function of the mill exit temperature.

The feed quantity is regulated as a function of the classifier flow which comes about. The classifier flow regulates the feed quantity such that it is not possible to exceed approximately 70% of the nominal flow.

The introduction member (4) which functions here is a speed-regulated bucket wheel which meters the feed material from a reservoir container via a cyclical lock, which serves as a barometric endpoint, into the grinding chamber, which is at superatmospheric pressure.

The coarse material is comminuted in the expanding steam jets (grinding gas). Together with the depressurized grinding gas, the product particles ascend in the center of the mill vessel to the classifying wheel. Depending on the classifier speed and grinding steam quantity which have been set, the particles whose fineness is sufficient enter along with the grinding steam into the fines exit, and from there they pass into the downstream separating system, while particles which are too coarse pass back into the grinding zone and are subjected to a repeat comminution. The discharge of the separated fines from the separation filter into the subsequent silo storage and bagging operation takes place by means of a bucket-wheel lock.

The grinding pressure of the grinding gas that obtains at the grinding nozzles, and the resulting volume of grinding gas, in conjunction with the speed of the dynamic paddle wheel classifier, determine the fineness of the particle-size distribution function and also the upper particle-size limit.

In one preferred embodiment, the process according to the invention may be carried out in a grinding system (grinding apparatus), preferably in a grinding system comprising a jet mill, particularly preferably comprising an opposed-jet mill. For this purpose, a feed material to be comminuted is accelerated in expanding gas jets of high velocity and comminuted by particle-particle impacts. Very particularly preferably used jet mills are fluid-bed opposed-jet mills or dense-bed jet mills or spiral jet mills. In the case of the very particularly preferred fluid-bed opposed-jet mill, two or more grinding jet inlets are located in the lower third of the grinding chamber, preferably in the form of grinding nozzles, which are preferably present in a horizontal plane. The grinding jet inlets are particularly preferably arranged at the circumference of the preferably round mill vessel so that the grinding jets all meet at one point in the interior of the grinding container. Particularly preferably, the grinding jet inlets are distributed uniformly over the circumference of the grinding container. In the case of three grinding jet inlets, the spacing would therefore be 120° in each case.

Figure 3:
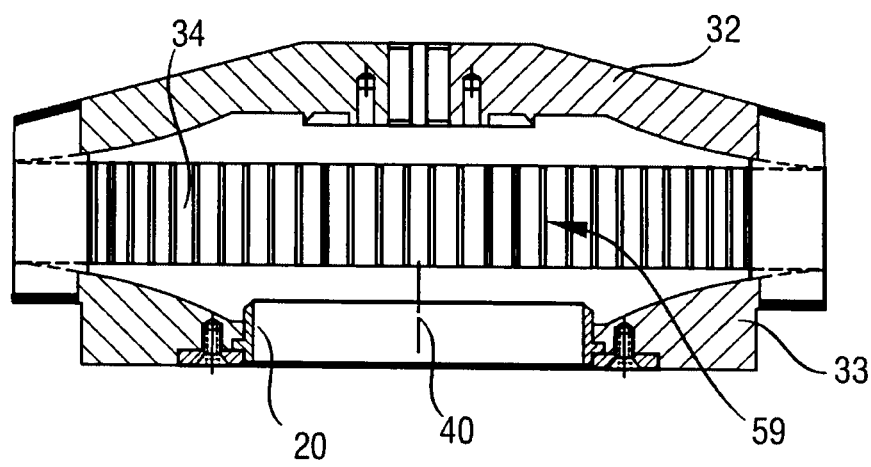
FIG. 3 shows, in schematic representation and as a vertical section, a classifying wheel of a pneumatic classifier.

In a special embodiment of the process according to the invention, the grinding system (grinding apparatus) comprises a classifier, preferably a dynamic classifier, particularly preferably a dynamic paddle wheel classifier, especially preferably a classifier according to FIGS. 2 and 3.

Figure 3A:
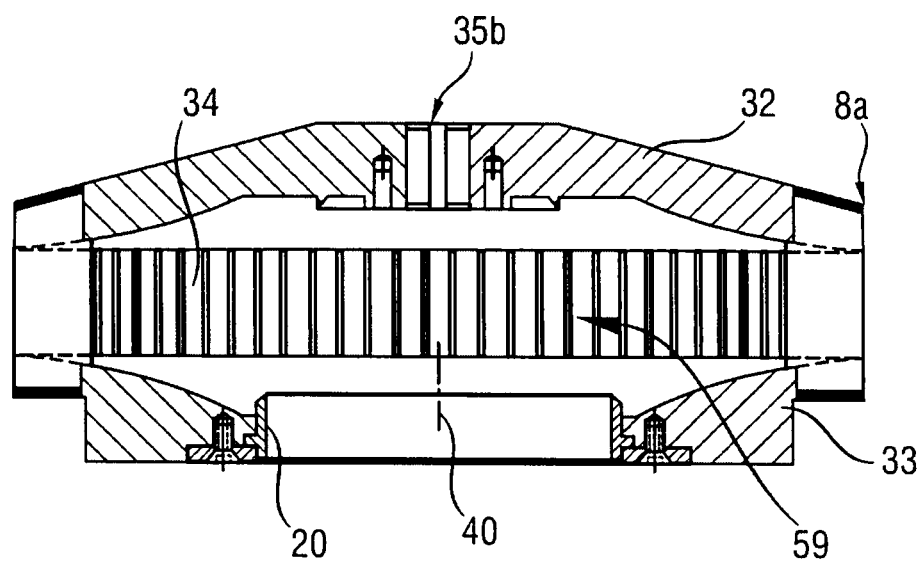
FIG. 3a shows, in schematic representation and as a vertical section, a classifying wheel of a pneumatic classifier analogous to FIG. 3 but with flushing of classifier gap 8a and shaft lead-through 35b.

In a particularly preferred embodiment, a dynamic pneumatic classifier according to FIGS. 2a and 3a may be used. This dynamic pneumatic classifier contains a classifying wheel and a classifying wheel shaft and a classifier housing, a classifier gap being formed between the classifying wheel and the classifier housing and a shaft lead-through being formed between the classifying wheel shaft and the classifier housing, and is characterized in that flushing of classifier gap and/or shaft lead-through with compressed gases of low energy may be effected. By using a classifier in combination with the jet mill operated under the conditions according to the invention, a limit is imposed on the oversize particles, the product particles ascending together with the depressurized gas jets being passed from the center of the grinding container through the classifier, and the product which has a sufficient fineness then being discharged from the classifier and from the mill. Particles which are too coarse return to the grinding zone and are subjected to further comminution.

In the grinding system, a classifier can be connected as a separate unit downstream of the mill, but an integrated classifier is preferably used. One particularly preferred grinding operation includes a heating phase upstream of the actual grinding step, in which phase it is ensured that the grinding chamber, particularly preferably all substantial components of the mill and/or of the grinding system on which water and/or steam could condense, is/are heated up so that its/their temperature is above the dew point of the vapor. Heating up can in principle be effected by any heating method. However, the heating up is preferably effected by passing hot gas through the mill and/or the entire grinding system so that the temperature of the gas is higher at the mill exit than the dew point of the vapor. Particularly preferably here it is ensured that the hot gas preferably sufficiently heats up all substantial components of the mill and/or of the entire grinding system which come into contact with the steam.

The heating gas used may in principle be any desired gas and/or gas mixtures, but hot air and/or combustion gases and/or inert gases are preferably used. The temperature of the hot gas is above the dew point of the steam. The hot gas may in principle be introduced at any desired point into the grinding chamber. Inlets or nozzles are preferably present for this purpose in the grinding chamber. These inlets or nozzles may be the same inlets or nozzles through which the grinding jets are also passed during the grinding phase (grinding nozzles). However, it is also possible for separate inlets or nozzles (heating nozzles) through which the hot gas and/or gas mixture can be passed to be present in the grinding chamber. In a preferred embodiment, the heating gas or heating gas mixture is introduced through at least two, preferably three or more, inlets and nozzles which are arranged in a plane and are arranged at the circumference of the preferably round mill container in such a way that the jets all meet at one point in the interior of the grinding container. Particularly preferably, the inlets or nozzles are distributed uniformly over the circumference of the grinding container.

During the grinding, a gas and/or a vapor, preferably steam and/or a gas/steam mixture, may be let down through the grinding jet inlets, preferably in the form of grinding nozzles, as operating medium. This operating medium has as a rule a substantially higher sound velocity than air (343 m/s), preferably at least 450 m/s. Advantageously, the operating medium comprises steam and/or hydrogen gas and/or argon and/or helium. It may particularly preferably be superheated steam. In order to achieve very fine grinding, it has proved particularly advantageous if the operating medium is let down into the mill at a pressure of 15 to 250 bar, particularly preferably of 20 to 150 bar, very particularly preferably 30 to 70 bar and especially preferably 40 to 65 bar. The operating medium also particularly preferably has a temperature of 200 to 800° C., particularly preferably 250 to 600° C. and in particular 300 to 400° C.

In the case of steam as an operating medium, i.e. particularly when the vapor feed pipe is connected to a steam source, it proves to be particularly advantageous if the grinding or inlet nozzles are connected to a vapor feed pipe which is equipped with expansion bends.

Furthermore, it has proved to be advantageous if the surface area of the jet mill has as small a value as possible and/or the flow paths are at least substantially free of projections and/or if the components of the jet mill are designed for avoiding accumulations. By these measures, deposition of the material to be ground in the mill may additionally be prevented.

The invention may be explained in more detail merely by way of example with reference to the below-described preferred and special embodiments of the process according to the invention and the preferred and particularly suitable versions of jet mills and the drawings and descriptions of the drawings. These working and use examples are provided herein for purposes of illustration only, and are not intended to be limiting unless otherwise specified.

Individual features which are stated and/or shown in relation to specific working examples are not limited to these working examples or the combination with the other features of these working examples but may be combined, within the technical possibilities, with any other variants, even if they are not separately discussed in the present documents.

Identical reference numerals in the individual figures and images of the drawings designate identical or similar components or components having an identical or similar effect. The diagrams in the drawing also clarify those features which are not provided with reference numerals, regardless of whether such features are described below or not. On the other hand, features which are contained in the present description but not visible or shown in the drawing, are also readily understandable for a person skilled in the art.

As already indicated above, a jet mill, preferably an opposed-jet mill, comprising integrated classifier, preferably an integrated dynamic pneumatic classifier, may be used for the production of very fine particles in the process according to the invention. Particularly preferably, the pneumatic classifier contains a classifying wheel and a classifying wheel shaft and a classifier housing, a classifier gap being formed between the classifying wheel and the classifier housing and a shaft lead-through being formed between the classifying wheel shaft and the classifier housing, and is operated in such a way that flushing of classifier gap and/or shaft lead-through with compressed gases of low energy is effected.

Preferably, the flushing gas may be used at a pressure of not more than at least approximately 0.4 bar, particularly preferably not more than at least about 0.3 bar and in particular not more than about 0.2 bar above the internal pressure of the mill. The internal pressure of the mill may be at least approximately in the range from 0.1 to 0.5 bar.

Furthermore, it may be preferable if the flushing gas is used at a temperature of about 80 to about 120° C., in particular approximately 100° C., and/or if the flushing gas used is low-energy compressed air, in particular at about 0.3 bar to about 0.4 bar.

The speed of a classifying rotor of the pneumatic classifier and the internal amplification ratio V (=Di/DF) may be chosen or set or may be regulated so that the circumferential speed of the operating medium (B) at an immersed pipe or exit port coordinated with the classifying wheel reaches up to 0.8 times the sound velocity of the operating medium. In the formula V (=Di/DF), Di denotes the internal diameter of the classifying wheel (8), i.e. the distance between the inner edges of the blades (34), and DF denotes the internal diameter of the immersed pipe (20). In one particularly preferred embodiment the internal diameter of the classifying wheel, Di, may be 280 mm and the internal diameter of the immersed pipe, DF, may be 100 mm. For the definition of the amplification ratio, see also Dr. R. Nied, "Strömungsmechanik und Thermodynamik in der mechanischen Verfahrenstechnik", available from the Corporate Consultancy of Dr. Roland Nied, 86486 Bonstetten, Germany. Also available from NETZSCH-CONDUX Mahltechnik GmbH, Rodenbacher Chaussee 1, 63457 Hanau, Germany.

This can be further developed if the speed of a classifying rotor of the pneumatic classifier and the internal amplification ratio V (=Di/DF) are chosen or set or are regulated so that the circumferential speed of the operating medium (B) at the immersed pipe or exit port reaches up to 0.7 times and particularly preferably up to 0.6 times the sound velocity of the operating medium.

In particular, it is furthermore possible advantageously to ensure that the classifying rotor has a height clearance which increases with decreasing radius, that area of the classifying rotor through which flow takes place preferably being at least approximately constant. Alternatively or in addition, it may be advantageous if the classifying rotor has an interchangeable, co-rotating immersed pipe. In an even further variant, it may be preferable to provide a fines outlet chamber which has a widening cross section in the direction of flow.

Furthermore, the jet mill according to the invention may advantageously contain in particular a pneumatic classifier which contains the individual features or combinations of features of the pneumatic classifier according to EP 0 472 930 B1. The entire disclosure content of EP 0 472 930 B1 is hereby incorporated by reference in its entirety, in order to avoid simply adopting identical subject matter. In particular, the pneumatic classifier may contain means for reducing the circumferential components of flow according to EP 0 472 930 B1. It is possible in particular to ensure that an exit port which is coordinated with the classifying wheel of the pneumatic classifier and is in the form of an immersed pipe has, in the direction of flow, a widening cross section which is preferably designed to be rounded for avoiding eddy formations.

Preferred and/or advantageous embodiments of the grinding system which may be used in the process according to the invention or of the mill are evident from FIGS. 1 to 3*a* and the associated description, it once again being emphasized that these embodiments merely explain the invention in more detail by way of example, i.e. said invention is not limited to these working examples and use examples or to the respective combinations of features within individual working examples.

FIG. 1 shows a working example of a jet mill 1 comprising a cylindrical housing 2, which encloses a grinding chamber 3, a feed 4 for material to be ground, approximately at half the height of the grinding chamber 3, at least one grinding jet inlet 5 in the lower region of the grinding chamber 3 and a product outlet 6 in the upper region of the grinding chamber 3. Arranged there is a pneumatic classifier 7 having a rotatable classifying wheel 8 with which the milled material (not shown) is classified in order to remove only milled material below a certain particle size through the product outlet 6 from the grinding chamber 3 and to feed ground material having a particle size above the chosen value to a further grinding procedure.

The classifying wheel 8 may be a classifying wheel which is customary in pneumatic classifiers and the blades of which (cf. below, for example in relation to FIG. 3) bound radial blade channels, at the outer ends of which the classifying air enters and particles of relatively small particle size or mass are entrained to the central outlet and to the product outlet 6 while larger particles or particles of greater mass are rejected under the influence of centrifugal force. Particularly preferably, the pneumatic classifier 7 and/or at least the classifying wheel 8 thereof are equipped with at least one design feature according to EP 0 472 930 B1.

It may be possible to provide only one grinding jet inlet 5, for example consisting of a single, radially directed inlet opening or inlet nozzle 9, in order to enable a single grinding jet 10 to meet, at high energy, the particles of material to be ground which reach the region of the grinding jet 10 from the feed 4 for material to be ground, and to divide the particles of material to be ground into smaller particles which are taken in by the classifying wheel 8 and, if they have reached an appropriately small size or mass, are transported to the outside through the product outlet 6. However, a better effect may be achieved with grinding jet inlets 5 which are diametrically opposite one another in pairs and form two grinding jets 10 which strike one another and result in more intense particle division than is possible with only one grinding jet 10, in particular if a plurality of grinding jet pairs are produced.

Preferably two or more grinding jet inlets, preferably grinding nozzles, in particular 3, 4, 5, 6, 7, 8, 9, 10, 11 or 12 grinding jet inlets, which are arranged in the lower third of the preferably cylindrical housing of the grinding chamber, may be used. These grinding jet inlets may be ideally arranged distributed in a plane and uniformly over the circumference of the grinding container so that the grinding jets all meet at one point in the interior of the grinding container. Particularly preferably, the inlets or nozzles are distributed uniformly over the circumference of the grinding container. In the case of three grinding jets, this would be an angle of 120° between the respective inlets or nozzles. In general, it may be said that the larger the grinding chamber, the more inlets or grinding nozzles that may be used.

In a preferred embodiment of the process according to the invention, the grinding chamber may, in addition to the grinding jet inlets, contain heating openings 5a, preferably in the form of heating nozzles, through which hot gas can be passed into the mill in the heating phase. These nozzles or openings may—as already described above—be arranged in the same plane as the grinding openings or nozzles 5. One heating opening or nozzle 5a, but preferably also a plurality of heating openings or nozzles 5a, particularly preferably 2, 3, 4, 5, 6, 7 or 8 heating openings or nozzles 5a, may be present.

In a very particularly preferred embodiment, the mill may contain two heating nozzles or openings and three grinding nozzles or openings.

For example, the processing temperature may, furthermore, be influenced by using an internal heating source 11 between feed 4 for material to be ground and the region of the grinding jets 10 or a corresponding heating source 12 in the region outside the feed 4 for material to be ground, or by processing particles of material to be ground which is in any case already warm and avoids heat losses in reaching the feed 4 for material to be ground, for which purpose a supply pipe 13 may be surrounded by a thermal insulation jacket 14. The heating source 11 or 12, if it is used, may in principle be of any desired form and therefore usable for the particular purpose and chosen according to availability on the market, so that further explanations in this context are not required.

In particular, the temperature of the grinding jet or of the grinding jets 10 may be relevant to the temperature, and the temperature of the material to be milled should at least approximately correspond to this grinding jet temperature.

For the formation of the grinding jets 10 introduced through grinding jet inlets 5 into the grinding chamber 3, superheated steam is used in the present working example. It is to be assumed that the heat content of the steam after the inlet nozzle 9 of the respective grinding jet inlet 5 is not substantially lower than before this inlet nozzle 9. Because the energy necessary for impact comminution is to be available primarily as flow energy, the pressure drop between the inlet 15 of the inlet nozzle 9 and the outlet 16 thereof will be considerable in comparison (the pressure energy will be very substantially converted into flow energy) and the temperature drop too will be not inconsiderable. This temperature drop in particular should be compensated by the heating of the material to be ground, to such an extent that material to be ground and grinding jet 10 have the same temperature in the region of the center 17 of the grinding chamber 3 when at least two grinding jets 10 meet one another or in the case of a multiplicity of two grinding jets 10.

Regarding the design of and procedure for preparing the grinding jet 10 comprising superheated steam, in particular in the form of a closed system, reference is made to DE 198 24 062 A1, the complete disclosure of which is herein incorporated by reference in its entirety. For example, grinding of hot slag as material to be ground is possible with optimum efficiency by a closed system.

In the diagram of the present working example of the jet mill 1, any feed of an operating medium B may be typified by a reservoir or generating means 18, which represents, for example, a tank 18a, from which the operating medium B is passed via pipe installations 19 to the grinding jet inlet 5 or the grinding jet inlets 5 to form the grinding jet 10 or the grinding jets 10.

In particular, starting from a jet mill 1 equipped with a pneumatic classifier 7, the relevant working examples being intended and understood herein only as exemplary and not as limiting, a process for producing very fine particles was carried out with this jet mill 1 using an integrated dynamic pneumatic classifier 7. Apart from the fact that the grinding phase was preceded by a heating phase in which all parts which came into contact with the vapor were heated to a temperature above the dew point of the vapor and the fact that a preferably integrated classifier was used, the innovation compared with conventional jet mills was that the speed of the classifying rotor or classifying wheel 8 of the pneumatic classifier 7 and the internal amplification ratio V (=Di/DF) were preferably chosen, set or regulated so that the circumferential speed of an operating medium B at an immersion pipe or exit port 20 coordinated with the classifying wheel 8 reached up to 0.8 times, preferably up to 0.7 times and particularly preferably up to 0.6 times the sound velocity of the operating medium B.

With reference to the previously explained variant with superheated steam as operating medium B or as an alternative thereto, it may be particularly advantageous to use, as operating medium, gases or vapors B which have a higher and in particular substantially higher sound velocity than air (343 m/s). Specifically, gases or vapors B which have a sound velocity of at least 450 m/s may be used as operating medium. This substantially improves the production and the yield of very fine particles compared with processes using other operating media, as are conventionally used according to practical knowledge, and hence optimizes the process overall.

A fluid, preferably the abovementioned steam, but also hydrogen gas or helium gas, may be used as operating medium B.

In a preferred embodiment, the jet mill 1, which may in particular be a fluid-bed jet mill or a dense-bed jet mill or a spiral jet mill, may be formed or designed with the integrated dynamic pneumatic classifier 7 for producing very fine particles or provided with suitable devices so that the speed of the classifying rotor or classifying wheel 8 of the pneumatic classifier 7 and the internal amplification ratio V (=Di/DF) may be chosen or set or regulated or controlled so that the circumferential speed of the operating medium B at the immersion pipe or exit port 20 reaches up to 0.8 times, preferably up to 0.7 times and particularly preferably up to 0.6 times the sound velocity of the operating medium B.

Furthermore, the jet mill 1 may be preferably equipped with a source, for example the reservoir or generating means 18 for steam or superheated steam or another suitable reservoir or generating means, for an operating medium B, or such an operating medium source may be coordinated with it, from which, for operation, an operating medium B may be fed at a higher and in particular substantially higher sound velocity than air (343 m/s), such as, preferably, a sound velocity of at least 450 m/s. This operating medium source, such as, for example, the reservoir or generating means 18 for steam or superheated steam, may contain gases or vapors B for use during operation of the jet mill 1, in particular the abovementioned steam, but hydrogen gas and helium gas may also be preferred alternatives.

Particularly with the use of hot steam as operating medium B, it may be advantageous to provide pipe installations 19 which are equipped with expansion bends (not shown), and may then also to be designated as vapor supply pipe, to the inlet or grinding nozzles 9, i.e. preferably when the vapor supply pipe is connected to a steam source as a reservoir or generating means 18.

A further advantageous aspect in the use of steam as operating medium B consists in providing the jet mill 1 with a surface area which may be as small as possible, or in other words in optimizing the jet mill 1 with regard to as small a surface area as possible. Particularly in relation to steam as operating medium B, it may be particularly advantageous to avoid heat exchange or heat loss and hence energy loss in the system. This purpose may also be served by the further alternative or additional design measures, namely designing the components of the jet mill 1 for avoiding accumulations or optimizing said components in this respect. This may be realized, for example, by using flanges which are as thin as possible in the pipe installations 19 and for connection of the pipe installations 19. Energy loss and also other flow-relevant adverse effects may furthermore be suppressed or avoided if the components of the jet mill 1 are designed or optimized for avoiding condensation. Even special devices (not shown) for avoiding condensation may be present for this purpose. Furthermore, it may be advantageous if the flow paths are at least substantially free of projections or optimized in this respect. In other words, the principle of avoiding as much as possible or everything which can become cold and where condensation may therefore arise may be implemented by these design variants individually or in any desired combinations.

Furthermore, it may be advantageous and therefore preferable if the classifying rotor has a height clearance increasing with decreasing radius, i.e. towards its axis, in particular that area of the classifying rotor through which flow takes place being at least approximately constant. Firstly or alternatively, it may be possible to provide a fines outlet chamber which has a widening cross section in the direction of flow.

A particularly preferred embodiment in the case of the jet mill 1 consists in the classifying rotor 8 having an interchangeable, corotating immersion pipe 20. Further details and variants of preferred designs of the jet mill 1 and its components are explained below with reference to FIGS. 2 and 3.

The jet mill 1 preferably contains, as shown in the schematic diagram in FIG. 2, an integrated pneumatic classifier 7 which may be, for example in the case of designs of the jet mill 1 as a fluid-bed jet mill or as a dense-bed jet mill or as a spiral jet mill, a dynamic pneumatic classifier 7 which may be advantageously arranged in the center of the grinding chamber 3 of the jet mill 1. Depending on the volume flow rate of grinding gas and classifier speed, the desired fineness of the material to be ground can be influenced.

In the pneumatic classifier 7 of the jet mill 1 according to FIG. 2, the entire vertical pneumatic classifier 7 may be enclosed by a classifier housing 21 which substantially comprises the upper part 22 of the housing and the lower part 23 of the housing. The upper part 22 of the housing and the lower part 23 of the housing may be provided at the upper and lower edge, respectively, with in each case an outward-directed circumferential flange 24 and 25, respectively. The two circumferential flanges 24, 25 are present one on top of the other in the installation or operational state of the pneumatic classifier 8 and may be fixed by suitable means to one another. Suitable means for fixing are, for example, screw connections (not shown). Clamps (not shown) or the like can also serve as detachable fixing means.

At virtually any desired point of the flange circumference, two circumferential flanges 24 and 25 may be connected to one another by an articulated joint 26 so that, after the flange connecting means have been released, the upper part 22 of the housing may be swiveled upwards relative to the lower part 23 of the housing in the direction of the arrow 27 and the upper part 22 of the housing may be accessible from below and the lower part 23 of the housing from above. The lower part 23 of the housing in turn may be formed in two parts and substantially comprises the cylindrical classifying chamber housing 28 with the circumferential flange 25 at its upper open end and a discharge cone 29 which tapers conically downwards. The discharge cone 29 and the classifying chamber housing 28 rest one on top of the other with flanges 30, 31 at the upper and lower end, respectively, and the two flanges 30, 31 of discharge cone 29 and classifying chamber housing 28 may be connected to one another by detachable fixing means (not shown) like the circumferential flanges 24, 25. The classifier housing 21 assembled in this manner may be suspended in or from carrying arms 28a, a plurality of which may be distributed as far as possible uniformly spaced around the circumference of the classifier or compressor housing 21 of the pneumatic classifier 7 of the jet mill 1 and grip the cylindrical classifying chamber housing 28.

A substantial part of the housing internals of the pneumatic classifier 7 may in turn be the classifying wheel 8 having an upper coverplate 32, having a lower coverplate 33 axially a distance away and on the outflow side and having blades 34 of expedient contour which are arranged between the outer edges of the two coverplates 32 and 33, firmly connected to these and distributed uniformly around the circumference of the classifying wheel 8. In the case of this pneumatic classifier 7, the classifying wheel 8 may be driven via the upper coverplate 32 while the lower coverplate 33 may be the coverplate on the outflow side. The mounting of the classifying wheel 8 comprises a classifying wheel shaft 35 which may be positively driven in an expedient manner, may be led out of the classifier housing 21 at the upper end and, with its lower end inside the classifier housing 21, may support the classifying wheel 8 non-rotatably in an overhung bearing. The classifying wheel shaft 35 may be led out of the classifier housing 21 in a pair of machined plates 36, 37 which close the classifier housing 21 at the upper end of a housing end section 38 in the form of a truncated cone at the top, guide the classifying wheel shaft 35 and seal this shaft passage without hindering the rotational movements of the classifying wheel shaft 35. Expediently, the upper plate 36 may be coordinated in the form of a flange non-rotatably with the classifying wheel shaft 35 and supported rotatably via pivot bearing 35a on the lower plate 37, which in turn may be coordinated with a housing end section 38. The underside of the coverplate 33 on the outflow side may be in the common plane between the circumferential flanges 24 and 25, so that the classifying wheel 8 is arranged in its totality within the hinged upper part 22 of the housing. In the region of the conical housing end section 38, the upper part 22 of the housing also has a tubular product feed port 39 of the feed 4 for material to be ground, the longitudinal axis of which product feed port may be parallel to the axis 40 of rotation of the classifying wheel 8 and its drive or classifying wheel shaft 35, and which product feed port may be arranged radially outside on the upper part 22 of the housing, as far as possible from this axis 40 of rotation of the classifying wheel 8 and its drive or classifying wheel shaft 35.

In a particularly preferred embodiment according to FIGS. 2a and 3a, the integrated dynamic pneumatic classifier 1 contains a classifying wheel 8 and a classifying wheel shaft 35 and a classifier housing, as has already been explained. A classifier gap 8a may be defined between the classifying wheel 8 and the classifier housing 21, and a shaft lead-through 35b may be formed between the classifying wheel shaft and the classifier housing 21 (cf. in this context FIGS. 2a and 3a). In particular, starting from a jet mill 1 equipped with such a pneumatic classifier 7, the relevant working examples being understood here as being only exemplary and not limiting, a process for producing very fine particles may be carried out using this jet mill 1, comprising an integrated dynamic pneumatic classifier 7. In addition to the fact that the grinding chamber may be heated before the grinding phase to a temperature above the dew point of the vapor, the innovation compared with conventional jet mills consists in flushing of classifier gap 8a and/or shaft lead-through 35b with compressed gases of low energy. The peculiarity of this design is precisely the combination of the use of these compressed low-energy gases with the high-energy superheated steam, with which the mill is fed through the grinding jet inlets, in particular grinding nozzles or grinding nozzles present therein. Thus, high-energy media and low-energy media are simultaneously used.

In the embodiment according to both FIGS. 2 and 3 on the one hand and 2a and 3a on the other hand, the classifier housing 21 receives the tubular exit port 20 which may be arranged coaxially with the classifying wheel 8 and rests with its upper end just below the coverplate 33 of the classifying wheel 8, which coverplate is on the outflow side, but without being connected thereto. Mounted axially in coincidence at the lower end of the exit port 20 in the form of a tube may be an exit chamber 41 which is likewise tubular but the diameter of which may be substantially larger than the diameter of the exit port 20 and in the present working example may be at least twice as large as the diameter of the exit port 20. A substantial jump in diameter may be therefore present at the transition between the exit port 20 and the exit chamber 41. The exit port 20 may be inserted into an upper coverplate 42 of the exit chamber 41. At the bottom, the exit chamber 41 may be closed by a removable cover 43. The assembly comprising exit port 20 and exit chamber 41 may be held in a plurality of carrying arms 44 which are distributed uniformly in a star-like manner around the circumference of the assembly, connected firmly at their inner ends in the region of the exit port 20 to the assembly and fixed with their outer ends to the classifier housing 21.

The exit port 20 may be surrounded by a conical annular housing 45, the lower, larger external diameter of which corresponds at least approximately to the diameter of the exit chamber 41 and the upper, smaller external diameter of which corresponds at least approximately to the diameter of the classifying wheel 8. The carrying arms 44 end at the conical wall of the annular housing 45 and are connected firmly to this wall, which in turn is part of the assembly comprising exit port 20 and exit chamber 41.

The carrying arms 44 and the annular housing 45 are parts of the flushing air device (not shown), the flushing air preventing the penetration of material from the interior of the classifier housing 21 into the gap between the classifying wheel 8 or more exactly the lower coverplate 3 thereof and the exit port 20. In order to enable this flushing air to reach the annular housing 45 and from there the gap to be kept free, the carrying arms 44 may be in the form of tubes, with their outer end sections led through the wall of the classifier housing 21 and connected via an intake filter 46 to a flushing air source (not shown). The annular housing 45 may be closed at the top by a perforated plate 47 and the gap itself can be adjustable by an axially adjustable annular disk in the region between perforated plate 47 and lower coverplate 33 of the classifying wheel 8.

The exit from the exit chamber 41 may be formed by a fines discharge pipe 48 which is led from the outside into the classifier housing 21 and is connected tangentially to the exit chamber 41. The fines discharge pipe 48 is part of the product outlet 6. A deflection cone 49 serves for cladding the entrance of the fines discharge pipe 48 at the exit chamber 41.

At the lower end of the conical housing end section 38, a classifying air entry coil 50 and a coarse product discharge 51 may be coordinated in horizontal arrangement with the housing end section 38. The direction of rotation of the classifying air entry coil 50 may be in the opposite direction to the direction of rotation of the classifying wheel 8. The coarse product discharge 51 may be detachably coordinated with the housing end section 38, a flange 52 being coordinated with the lower end of the housing end section 38 and a flange 53 with the upper end of the coarse product discharge 51, and both flanges 52 and 53 in turn being detachably connected to one another by known means when the pneumatic classifier 7 is ready for operation.

The dispersion zone to be designed may be designated by 54. Flanges machined (beveled) on the inner edge, for clean flow, and a simple lining are designated by 55.

Finally, a replaceable protection pipe 56 may also be mounted as a closure part on the inner wall of the exit port 20, and a corresponding replaceable protection pipe 57 may be mounted on the inner wall of the exit chamber 41.

At the beginning of operation of the pneumatic classifier 7 in the operating state shown, classifying air may be introduced via the classifying air entry coil 50 into the pneumatic classifier 7 under a pressure gradient and with an entry velocity chosen according to the purpose. As a result of introducing the classifying air by means of a coil, in particular in combination with the conicity of the housing end section 38, the classifying air rises spirally upwards in the region of the classifying wheel 8. At the same time, the "product" comprising solid particles of different mass may be introduced via the product feed port 39 into the classifier housing 21. Of this product, the coarse material, i.e. the particle fraction having a greater mass, moves in a direction opposite to the classifying air into the region of the coarse product discharge 51 and is readied for further processing. The fines, i.e. the particle fraction having a lower mass, is mixed with the classifying air, passes radially from the outside inwards through the classifying wheel 8 into the exit port 20, into the exit chamber 41 and finally via a fines discharge pipe 48 into a fines outlet 58, and from there into a filter in which the operating medium in the form of a fluid, such as, for example air, and fines are separated from one another. Coarser constituents of the fines are removed radially from the classifying wheel 8 by centrifugal force and mixed with the coarse material in order to leave the classifier housing 21 with the coarse material or to circulate in the classifier housing 21 until it has become fines having a particle size such that it is discharged with the classifying air.

Owing to the abrupt widening of the cross section from the exit port 20 to the exit chamber 41, a substantial reduction in the flow velocity of the fines/air mixture takes place there. This mixture will therefore pass at a very low flow velocity through the exit chamber 41 via the fines discharge pipe 48 into the fines outlet 58 and produce only a small amount of abraded material on the wall of the exit chamber 41. For this reason, the protection pipe 57 is also only a very precautionary measure. The high flow velocity in the classifying wheel 8, for reasons relating to a good separation technique, also prevails, however, in the discharge or exit port 20, and the protection pipe 56 is therefore more important than the protection pipe 57. Particularly important is the jump in diameter with a diameter increase at the transition from the exit port 20 into the exit chamber 41.

The pneumatic classifier 7 may besides in turn be readily maintained as a result of the subdivision of the classifier housing 21 in the manner described and the coordination of the classifier components with the individual part-housings, and components which have become damaged can be changed with relatively little effort and within short maintenance times.

While the classifying wheel 8 with the two coverplates 32 and 33 and the blade ring 59 arranged between them and having the blades 34 may be shown in the schematic diagram of FIGS. 2 and 2a in the already known, customary form with parallel coverplates 32 and 33 having parallel surfaces, the classifying wheel 8 may be shown in FIGS. 3 and 3a for a further working example of the pneumatic classifier 7 of an advantageous further development.

This classifying wheel 8 according to FIGS. 3 and 3a contains, in addition to the blade ring 59 with the blades 34, the upper coverplate 32 and the lower coverplate 33 an axial distance away therefrom and located on the outflow side, and is rotatable about the axis 40 of rotation and thus the longitudinal axis of the pneumatic classifier 7. The diametric dimension of the classifying wheel 8 is perpendicular to the axis 40 of rotation, i.e. to the longitudinal axis of the pneumatic classifier 7, regardless of whether the axis 40 of rotation and hence said longitudinal axis are perpendicular or horizontal. The lower coverplate 33 on the outflow side concentrically encloses the exit port 20. The blades 34 are connected to the two coverplates 33 and 32. The two coverplates 32 and 33 are now, in contrast to the prior art, conical, preferably such that the distance of the upper coverplate 32 from the coverplate 33 on the outflow side increases from the ring 59 of blades 34 inwards, i.e. towards the axis 40 of rotation, and does so preferably continuously, such as, for example, linearly or non-linearly, and more preferably so that the area of the cylinder jacket through which flow takes place remains at least approximately constant for every radius between blade outlet edges and exit port 20. The outflow velocity which decreases owing to the decreasing radius in known solutions remains at least approximately constant in this solution.

In addition to that variant of the design of the upper coverplate 32 and of the lower coverplate 33 which is explained above and in FIGS. 3 and 3a, it may also possible for only one of these two coverplates 32 or 33 to be conical in the manner explained and for the other coverplate 33 or 32 to be flat, as is the case for both coverplates 32 and 33 in relation to the working example according to FIG. 2. In particular, the shape of the coverplate which does not have parallel surfaces may be such that the area of the cylinder jacket through which flow takes place remains at least approximately constant for every radius between blade outlet edges and exit port 20.

A substantial step for setting the silanol group density and arrangement of silanol groups on the precipitated silica surface, in addition to the precipitation, in which the chain-like structure is constructed, may be the heat treatment to be carried out in step 5. This heat treatment may be carried out batchwise or continuously. For the heat treatment it may be possible, for example, to use a fluidized-bed, fluid-bed or rotary-tube reactor. It should be ensured that in the course of the heat treatment, the temperature distribution and the process gas atmosphere are homogeneous, so that all of the silica particles are exposed to identical conditions. The process gas must have a sufficient steam concentration. The steam concentration is preferably 10% to 95% by volume, more preferably 40% to 90% by weight, very preferably 50% to 90% by weight.

Particularly when using a rotary-tube reactor it must be ensured that the temperatures everywhere are the same, i.e. that no "cold zones" exist in which the steam could condense. The condensed steam may lead to the agglomeration of the silicas. The particular conditions during the heat treatment of the invention also ensure that a silica which has already been ground prior to heat treatment need not be ground once again after heat treatment, in other words that no instances of caking or agglomeration arise, such caking or agglomeration otherwise having to be removed by grinding again after heat treatment.

Preference may be given to using a fluidized-bed or fluid-bed reactor. By a fluidized bed is meant the following:

If a flow of gases from below traverses fine-particled bulk product lying on horizontal, perforated plates, under certain flow conditions a condition comes about which is similar to that of a boiling liquid; the layer bubbles; the particles of the bulk material are located within the layer in a continually fluidizing up-and-down motion and thus remain, so to speak, in suspension. Terms also used are therefore suspension bed, fluidized bed, fluid bed, and fluidizing. The associated large surface area of the fluidized product also facilitates the drying and heat treatment of solids.

It may be important that during heat treatment all particles of precipitated silica are exposed to the same temperature and the same process gas. The temperature differences between the hottest and coldest points ought to be as small as possible. Consequently the temperature of the filter candles as well must not be below the product temperature.

With very particular preference, the heat treatment in step 5 of the process of the invention may take place in accordance with 5a) to 5e) below:

5a) introducing the precipitated silica into the fluidized-bed reactor;

5b) preheating the reactor to 300 to 800° C., the reactor being traversed at the same time by a flow of inert gas and/or nitrogen/air mixture in such a way as to produce a fluidization velocity of 0.02 to 0.06 m/s;

5c) feeding in a gas mixture I comprising steam and an inert gas, e.g. nitrogen, or a gas mixture II comprising steam, an inert gas and air, at 300 to 800° C. for a period of 0.25 to 6 h, the gas mixture traversing the reactor with a fluidization velocity of 0.02 to 0.06 m/s, and the gas mixtures I and II having a steam concentration of 10 to 95% by volume and in the case of gas mixture II an oxygen content of 0.01% to 21% by volume;

5d) interrupting the addition of steam and expelling the steam by means of an inert gas, nitrogen for example, and/or of an inert gas/air mixture at 300 to 800° C., the gas or gas mixture traversing the reactor with a fluidization velocity of 0.02 to 0.06 m/s, and, if using the inert gas/air mixture, said mixture having an oxygen content of 0.01% to 21% by volume;

5e) cooling the heat-treated precipitated silica to room temperature in a dry process atmosphere, where, if using an inert gas/air mixture, said mixture has an oxygen content of 0.01% to 21% by volume;

After the precipitated silica has been introduced into the fluidized-bed reactor 5a), the reactor is heated in 5b) to an operating temperature of 300 to 800° C., preferably of 350 to 690° C. and more preferably of 400 to 650° C. During the heating operation the reactor may be traversed by a flow of inert gas, preferably nitrogen and/or a mixture of an inert gas and dry air, in such a way that a fluidization velocity of 0.02 to 0.06 m/s may be set.

After the operating temperature has been reached, in 5c) a gas mixture I comprising steam and an inert gas, preferably nitrogen, or a gas mixture II comprising steam, an inert gas and air is passed through the reactor for a period of 0.25 to 6 h, preferably 0.5 to 5 h, more preferably 1 to 4 h, very preferably 2 to 4 h. The fluidization velocity of the gas mixture may be 0.02 to 0.06 m/s. The gas mixtures I and II have a steam concentration of 10% to 95% by volume, preferably 40% to 90% by weight, very preferably 50% to 90% by weight and, in the case of gas mixture II an oxygen content of 0.01% to 21% by volume.

The material obtained after 5 or 6 may be acidified to a pH of 3-5, preferably 3.5 to 5, more preferably 4 to 4.7. This may be accomplished preferably using a gaseous acidifier, more preferably using gaseous hydrochloric acid and/or HBr and/or oxides of nitrogen and/or vaporized $SO_3$ and/or vaporized $SOCl_2$.

In a first embodiment of the process of the invention the acidification takes place by contacting at least one acidifier with the precipitated silica obtained after 5 or 6.

In a second embodiment the acidification takes place via the mixing of an acidified fraction with an unacidified fraction of the precipitated silica of the invention. In this embodiment the material obtained after 5 or 6 may be divided into fraction A and fraction B. Fraction A may be acidified by contacting with the acidifier, preferably gaseous HCl. Following acidification, fraction A may optionally be flushed with an inert gas, more preferably nitrogen. Fraction A may be acidified preferably to a pH of 2-4.5, more preferably 2.4-4, very preferably 3-4. Material from fraction B may then be added to the acidified fraction A until the resulting pH is 3-5, preferably 3.5 to 5, more preferably 4 to 4.7. The procedure of acidifying and mixing may be repeated until the desired pH has been attained.

Irrespective of whether the acidification takes place according to embodiment 1 or embodiment 2, it may be followed by flushing with an inert gas, preferably nitrogen, in order to remove residues of the acidifier on the surface of the precipitated silica.

The silicas of the invention may be used in sealants, particularly in silicone rubber and silicone sealants and with particular preference in RTV-1K sealants. Their application may be possible in various crosslinking systems, e.g. acetoxy-crosslinking, alkoxy-crosslinking and oxime-crosslinking. These systems find application, for example in the building industry as joint-sealants, in the automotive industry as adhesives and sealants and as coating compositions for textile fabrics, for example.

The reaction conditions and the physical/chemical data of the precipitated silicas of the invention may determined by means of the following methods:

Determination of the Filtercake Solids Content

In accordance with this method the solids content of filtercakes were determined by removal of the volatile fractions at 105° C.

For this purpose 100.00 g of the filtercake were weighed out (initial mass E) into a dry, tared porcelain dish (20 cm diameter). The filtercake was broken up with a spatula if necessary to give loose lumps of not more than 1 cm$^3$. The sample was dried to constant weight in a drying cabinet at 105±2° C. Subsequently the sample was cooled to room temperature in a desiccator cabinet with silica gel as desiccant. The final mass A was determined gravimetrically.

The solids content (SC) in % was determined in accordance with $$SC = A/E * 100\%,$$

where A=final mass in g and E=initial mass in g.

Determination of the Precipitation Suspension Solids Content

The solids content of the precipitation suspension was determined gravimetrically after the sample was filtered.

100.0 ml of the homogenized precipitation suspension ($V_{suspension}$) were measured off at room temperature with the aid of a measuring cylinder. The sample was filtered through a circular filter (TYP 572, Schleicher & Schuell) in a porcelain suction filter unit, but was not sucked dry, so as to prevent cracking of the filtercake. Subsequently the filtercake was washed with 100.0 ml of distilled water. The washed filtercake was transferred to a tared porcelain dish and dried to constant weight in a drying oven at 105±2° C. The weight of the dried precipitated silica ($m_{sample}$) was determined after cooling to room temperature.

The solids content was determined in accordance with:
solids content in g/l=($m_{sample}$ in g)/($V_{suspension}$ in l).

Determination of the Precipitated Silica-Feed Solids Content

The precipitated silica feed was dried to constant weight in an IR drier. The loss on drying consists predominantly of water moisture.

2.0 g of precipitated silica feed were charged to a tared aluminum dish and the lid of the IR drying unit (Mettler, type LP 16) was closed. After the start button was pressed, drying of the suspension at 105° C. was commenced, and was ended automatically when the weight decrease per unit time fell below a value of 2 mg/(120 s).

The weight decrease in % was displayed directly by the instrument when the 0-100% mode was selected. The solids content was given by solids content in %=100%−weight decrease in %.

Determination of the pH

The pH of the precipitated silica, as a 5% aqueous suspension, was determined at room temperature in a method based on DIN EN ISO 787-9. In contrast to the specifications of the aforementioned standard, the initial masses were changed (5.00 g of precipitated silica to 100 ml of deionized water).

Determination of the Electrical Conductivity

The electrical conductivity of precipitated silica, as a 4% aqueous suspension, is determined at room temperature in a method based on DIN EN ISO 787-14. In contrast to the specifications of the aforementioned standard, the initial masses were changed (4.00 g of precipitated silica to 100 ml of deionized water).

Determination of the Moisture Content or Loss on Drying

The moisture content of precipitated silica was determined in accordance with ISO 787-2 after 2 hour drying in a forced-air drying cabinet at 105° C. This loss on drying is composed predominantly of moisture water.

Determination of the Loss on Ignition

By this method the loss in weight of precipitated silica was determined in a method based on DIN EN ISO 3262-1 at 1000° C. At this temperature, water bound physically and chemically, and also other volatile constituents escape. The moisture content (LD) of the sample investigated was determined by the above-described method "Determining the moisture content or loss on drying", based on DIN EN ISO 787-2.

0.5 g of the pulverulent, spherical or granular precipitated silica was weighed out to an accuracy of 0.1 mg into a tared porcelain crucible which had been purified beforehand by calcining (initial mass E). The sample was heated in a muffle furnace at 1000±50° C. for 2 h. The porcelain crucible was subsequently cooled to room temperature in a desiccator with precipitated silica gel as desiccant.

The final mass A was determined gravimetrically.

The loss on ignition (DIN) LOI in % was obtained in accordance with $$LOI=(1-A/F)*100.$$

F denotes the corrected initial mass in g based on dried matter, and was calculated according to $$F=E*(1-LD/100).$$

In the calculations A denotes final mass in g, E denotes initial mass in g and LD denotes loss on drying, in %.

Determination of the BET Surface Area

The specific nitrogen surface (called the BET surface area below) of the pulverulent, spherical or granular precipitated silica was determined by a method based on ISO 5794-1/ Annexe D using the TRISTAR 3000 instrument (from Micromeritics) in accordance with the multipoint determination of DIN-ISO 9277.

Determination of the CTAB Surface Area

The method was based on the adsorption of CTAB (N-hexadecyl-N,N,N-trimethylammonium bromide) on the "external" surface of the precipitated silica, in a method based on ASTM 3765 or NFT 45-007 (section 5.12.1.3).

CTAB was adsorbed in aqueous solution with stirring and ultrasound treatment. Excess, unadsorbed CTAB was determined by back-titration with SDSS (sodium dioctylsulfosuccinate solution, "Aerosol OT" solution) using a titroprocessor, the endpoint being given by the turbidity maximum of the solution and determined using a phototrode. The temperature throughout all of the operations conducted was 23-25° C., to prevent crystallization of CTAB. The back-titration was based on the following reaction equation:

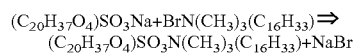

SDSS CTAB

Apparatus

Mettler Toledo DL55 titroprocessor and Mettler Toledo DL70 titroprocessor, each equipped with pH electrode, Mettler, type DG111 and phototrode, Mettler, type DP 550 100 ml polypropylene titration beaker
Glass titration vessel, 150 ml, with lid
Pressure filtration device, 100 ml capacity
Cellulose nitrate membrane filter, pore size 0.1 μm, 47 mm Ø, e.g. Whatman (Order No. 7181-004)

Reagents

The solutions of CTAB ($C_{CTAB}$=0.015 mol/l in deionized water) and SDSS (concentration=0.00423 mol/l in deionized water) were purchased in ready-to-use form (Bernd Kraft GmbH, 47167 Duisburg: Order No. 6056.4700 CTAB solution of concentration 0.015 mol/l; Order No. 6057.4700 SDSS solution 0.00423 mol/l), stored at 25° C. and used within one month.

Procedure

1. Blank Titration

The consumption of SDSS solution for titrating 5 ml of CTAB solution was checked 1× daily before each series of measurements. This was done by setting the phototrode, before beginning the titration, at 1000±20 mV (corresponding to a transparency of 100%).

Precisely 5.00 ml of CTAB solution were pipetted into a titration beaker and 50.0 ml of deionized water added. Titration with SDSS solution was carried out with stirring by the measurement method familiar to the skilled person, using the DL 55 titroprocessor, until the solution reached maximum turbidity. The consumption $V_A$ of SDSS solution in ml was determined. Each titration was performed in triplicate.

2. Adsorption 10.0 g of the pulverulent, spherical or granular precipitated silica with a moisture content of 5±2% (if appropriate, the moisture content was adjusted by drying at 105° C. in a drying cabinet or by uniform wetting) were comminuted for 30 seconds using a mill (Krups, model KM 75, article no. 2030-70). Precisely 500.0 mg of the comminuted sample (initial mass E) was transferred to a 150 ml titration vessel with magnetic stirrer rod and precisely 100.0 ml of CTAB solution ($T_1$) was metered in. The titration vessel was closed with a lid and stirred using an Ultra Turrax T 25 stirrer (stirrer shaft KV-18G, 18 mm diameter) at 18 000 rpm for not more than 1 minute until wetting was complete. The titration vessel was screwed on to the DL 70 titroprocessor and the pH of the suspension was adjusted with KOH (0.1 mol/l) to a figure of 9±0.05.

The suspension was sonicated for 4 minutes in the titration vessel in an ultrasound bath (Bandelin, Sonorex RK 106 S, 35 kHz, 100 W effective and 200 W peak output) at 25° C. This was followed immediately by pressure filtration through a membrane filter under a nitrogen pressure of 1.2 bar. The initial fraction of 5 ml was discarded.

3. Titration 5.00 ml of the remaining filtrate was pipetted into a 100 ml titration beaker and made up to 50.00 ml with deionized water. The titration beaker was screwed on to the DL 55 titroprocessor and titrated with SDSS solution, with stirring, until maximum turbidity was reached. The consumption $V_B$ of SDSS solution, in ml, was determined. Each titration was performed in triplicate.

Calculation $$CTAB \text{ (without moisture correction)} = \frac{V_A - V_B}{V_A} * \frac{C_{CTAB} * M_{CTAB} * T_1 * P}{E}$$

$V_A$=consumption of SDSS solution in ml in titrating the blank sample
$V_B$=consumption of SDSS solution in ml when using the filtrate
$C_{CTAB}$=concentration of CTAB solution in mol/l
$M_{CTAB}$=molar mass of CTAB=364.46 g/mol
$T_1$=amount of CTAB solution added in l
P=surface occupancy of CTAB=578.435 m$^2$/g
E=initial mass of precipitated silica
The CTAB surface area was based on the anhydrous precipitated silica, which is why the following correction was made.

$$CTAB = \frac{CTAB \text{ (without moisture correction) in } m^2/g * 100\%}{100\% - \text{moisture content in }\%}$$

The moisture content of the precipitated silica was determined in accordance with the above-described method "Determining the Moisture Content".

Determination of the DBP absorption

The DBP absorption (DBP number), which was a measure of the absorbency of the precipitated silica, was determined by a method based on the DIN 53601 standard, as follows:

12.50 g of pulverulent or spherical precipitated silica with a moisture content of 0-10% (the moisture content was adjusted, if appropriate, by drying at 105° C. in a drying cabinet) were introduced into the kneader chamber (article number 279061) of the Brabender Absorptometer "E" (without damping of the outlet filter of the torque sensor). In the case of granules, the sieve fraction from 1 to 3.15 mm (stainless steel sieves from Retsch) was used (by gently pressing the granules with a plastic spatula through the sieve with pore size of 3.15 mm). With continual mixing (kneader paddles rotating at a speed of 125 rpm), dibutyl phthalate was added dropwise to the mixture at a rate of 4 ml/min and at room temperature by means of the Brabender T 90/50 Dosimat. The incorporation of the DBP by mixing took place with only a small amount of force, and was monitored by means of the digital display. Towards the end of the determination the mixture became pasty which was indicated by a sharp increase in the required force. At a display reading of 600 digits (torque of 0.6 Nm) an electrical contact shut off both the kneader and the DBP feed. The synchronous motor for the DBP feed was coupled to a digital counter, so that the consumption of DBP in ml could be read.

The DBP absorption is reported in g/(100 g) and was calculated using the following formula:

$$DBP = \frac{V * D * 100}{E} * \frac{g}{100g} + K$$

where
DBP=DBP absorption in g/(100 g)
V=consumption of DBP in ml
D=density of DBP in g/ml (1.047 g/ml at 20° C.)
E=initial mass of precipitated silica in g
K=correction value as per moisture correction table in g/(100 g)

The DBP absorption was defined for the anhydrous, dried precipitated silica. If moisture precipitated silicas were used it was necessary to take into account the correction value K for calculating the DBP absorption. This value was determined using the correction table below: for example, precipitated silica having a water content of 5.8% required an add-on of 33 g/(100 g) for the DBP absorption. The moisture content of the precipitated silica was determined in accordance with the method "Determining the Moisture Content or Loss on Drying".

Moisture correction table for dibutyl phthalate absorption (anhydrous)

| % moisture | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

IR Determination

By means of IR spectroscopy it was possible to ascertain the different kinds of SiOH groups (isolated, bridged, +H$_2$O). To determine the intensities of the different silanol groups, the precipitated silicas were subjected to measurement in the form of powder layers. The absorbance values of the different silanol groups were divided (standardized) by the absorbance value of the SiO combination vibration band at 1870 cm$^{-1}$.

The IR-spectroscopic determination was accomplished by means of a Bruker IFS 85 FR-IR spectrometer. Measurement was made using a transparent NaCl monocrystal disk (round d=25 mm, h=5 mm) from K. Korth, Kiel, Germany, a 0.5 mm Teflon spacer and a mount for the disks. The spacer was placed on one clean, polished transparent NaCl monocrystal disk. The sample material was dusted on between the spacer and was covered with a further clean, polished transparent NaCl monocrystal disk; there were no air bubbles included. The two transparent NaCl monocrystal disks with the powder layer were clamped into the sample mount. The sample mount was brought into the IR beam path and the sample chamber closed. Prior to the measurement, the sample chamber was flushed with air essentially free of steam and carbon dioxide. In the alignment mode an "Align" was carried out, and measurement commenced.

Measurement was carried out using the following parameters:

| | |
|---|---|
| Resolution: | 2 cm$^{-1}$ |
| Scanner speed: | 6; 10.51 Hz |
| Measuring range: | 4500 cm$^{-1}$ to 100 cm$^{-1}$ |
| Apodization function: | triangular |
| Number of scans: | 128 |

The spectrum was expressed, in the wavenumber range from 4000 to 1400 cm$^{-1}$, in continuous wavenumbers.

Figure 4:
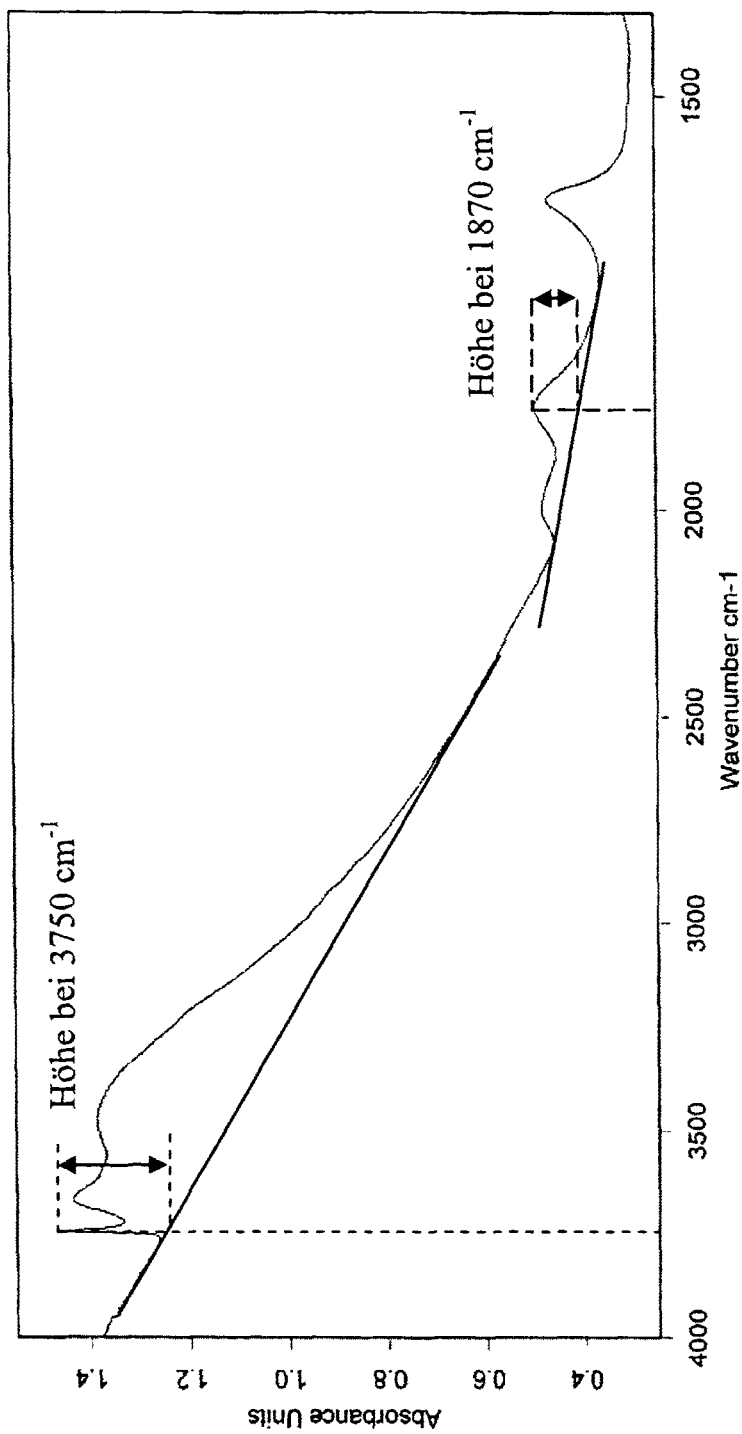
FIG. 4 shows a scheme for evaluating the IR spectra.

The $SiOH_{isolated}$ absorbance ratio was determined as follows (FIG. 4):

First of all, two baselines were set. This was done by applying two tangents to the absorption plot. The first tangent (1st baseline) touched the absorption plot first in the region from 4000 cm$^{-1}$ to 3800 cm$^{-1}$ and secondly in the region from 3000 cm$^{-1}$ to 2100 cm$^{-1}$. It was ensured that the tangent did not intersect the absorption plot either in the region from 4000 cm$^{-1}$ to 3800 cm$^{-1}$ or in the region from 3000 cm$^{-1}$ to 2100 cm$^{-1}$. The second tangent (2nd baseline) touched the absorption plot first in the region from 2200 cm$^{-1}$ to 2000 cm$^{-1}$ and secondly in the region from 1850 cm$^{-1}$ to 1650 cm$^{-1}$. It was ensured that the tangent dids not intersect the absorption plot either in the region from 2200 cm$^{-1}$ to 2000 cm$^{-1}$ or in the region from 1850 cm$^{-1}$ to 1650 cm$^{-1}$.

After the baselines were set, the perpendicular line was taken down from the maximum of the bands in question (3750 and 1870 cm$^{-1}$) to the respective baseline, and a measurement made of the respective heights from the maximum to the baseline, in mm. A ratio was formed as follows:

$$\text{Absorbance ratio } (SiOH_{isolated}) = \frac{\text{height from maximum to baseline in mm at 3750 cm}^{-1}}{\text{height from maximum to baseline in mm at 1870 cm}^{-1}}$$

For each sample six IR spectra were recorded, measurement taking place in each case with new sample material. Each IR spectrum was evaluated five times in accordance with the procedure described above. The absorbance ratio ($SiO_{isolated}$) was reported, finally, as the average value of all the evaluations.

Determination of the Contact Angle

The contact angle was determined as described in W. T. Yen, R. S. Chahal, T. Salman, Can. Met. Quart., Vol. 12, No. 3, 1973.

Determination of the Silanol Group Density

First of all the moisture content of the precipitated silica sample was determined in accordance with the section "Determining the Moisture Content or Loss on Drying". Thereafter 2-4 g of the sample (to an accuracy of 1 mg) were transferred to a pressure-tight glass apparatus (glass flask with dropping funnel) with a pressure measurement means attached. In this apparatus it was dried under reduced pressure (<1 hPa) at 120° for 1 h. At room temperature then, approximately 40 ml of a degassed 2% strength solution of LiAlH$_4$ in diglyme was added dropwise from a dropping funnel. If appropriate, further solution was added dropwise until no further increase in pressure was observed. The increase in pressure as a result of the hydrogen evolved when the LiAlH$_4$ reacted with the silanol groups of the precipitated silica was determined by way of pressure measurement (with the volume known as a result of calibration of the apparatus prior to measurement) to an accuracy of ≤1 hPa. From the increase in pressure it was possible, by calculation using the general gas equation, to work back to the silanol group concentration of the precipitated silica, taking into account the moisture content of the precipitated silica. The influence of the vapour pressure of the solvent was corrected correspondingly. The silanol group density was calculated as follows:

$$\text{Silanol group density} = \frac{\text{silanol group concentration}}{\text{BET surface area}}$$

Determination the Particle Size Distribution by Means of Laser Diffraction

The particle distribution was determined in accordance with the principle of laser diffraction on a laser diffractometer (Horiba, LA-920).

First of all the precipitated silica sample was dispersed in 100 ml of water without additional dispersing additives in a 150 ml glass beaker (diameter: 6 cm) in such a way as to give a dispersion having a weight fraction of 1% by weight $SiO_2$. This dispersion was then dispersed using an ultrasonic probe (Dr. Hielscher UP400s, Sonotrode H7) for a duration of 5 minutes intensely (300 W, without pulsing). For this purpose the ultrasonic probe was mounted such that its lower end was immersed to a distance of approximately 1 cm above the base of the glass beaker. Immediately following the dispersing operation the particle size distribution of a sample of the ultrasonicated dispersion was determined using the laser diffractometer (Horiba LA-920). For the evaluation, using the standard software supplied with the Horiba LA-920, a relative refractive index of 1.09 was selected.

All measurements tppk place at room temperature. The particle size distribution and also the relevant variables such as, for example, the particle size $d_{90}$ were automatically calculated and depicted in graph form by the instrument. Attention was paid to the notes in the operating instructions.

Determination of the Modified Tapped Density

With the "conventional" tapped density determination of DIN EN ISO 787-11, the result can be falsified by the fact that the precipitated silica has already undergone preliminary compaction in the course, for example, of being packed. In order to rule this out, a "modified tapped density" was determined for the precipitated silicas of the invention.

A porcelain suction filter unit (nominal size 110, diameter=12 cm, height=5.5 cm) fitted with a circular filter (e.g. type 598, Schleicher+Schüll) was filled loosely with precipitated silica to approximately 1 cm from the top edge, and was covered with elastic film (Parafilm®). The shape and dimensions of the elastic film was selected such that it finished very closely or completely flush with the edge of the porcelain suction filter unit. The unit was mounted on a suction bottle and then a vacuum of −0.7 bar applied for a period of 5 minutes. In the course of this operation, the precipitated silica was compacted uniformly by virtue of the film under suction. Then air was cautiously readmitted and the resulting precipitated silica plaque removed from the filter unit by being tipped forcefully into a porcelain dish.

The slightly precomminuted material was redispersed uniformly (in the manner of a precipitated silica/air aerosol) via a centrifugal mill (ZM1, Retsch, 0.5 mm screen insert, speed setting 1, without cyclone, without internal funnel insert) with an internal collecting dish (the precipitated silica (starting material) was introduced slowly—spatula by spatula—into the mill feed; the internal product collection dish was never completely full). During this operation the power consumption of the mill did not exceed 3 amperes. This operation was less a conventional grinding than a defined loosening of the precipitated silica structure (of air-jet-milled precipitated silicas, for example), since the energy input here was substantially weaker than in the case of jet milling.

5 g of the resulting material were weighed out to an accuracy of 0.1 g into the 250 ml volumetric cylinder of the jolting volumeter (STAV 2003 from Engelsmann). In a method based on DIN ISO 787-11, after jolting 1250 times, the resulting volume of the precipitated silica, in ml, was read off on the scale.

$$\text{Modified tapped density in } [g/l] = \frac{5g}{\text{tapped volume in [ml]}} \times \frac{1000 \text{ ml}}{1 l}$$

The examples below are intended to illustrate the invention in more detail without restricting its scope.

The waterglass and the sulfuric acid used at various points in the directions of the examples below were characterized as follows:
Waterglass: density 1.348 kg/l, 27.0% by weight $SiO_2$, 8.05% by weight $Na_2O$
Sulfuric acid: density 1.83 kg/l, 94% by weight Example 1

A 2 m³ precipitating vessel (diameter 160 cm) with inclined base, MIG inclined-blade stirrer system and Ekato Fluid shearing turbine was charged with 1680 l of deionized water and this initial charge heated to 92° C. After the temperature was reached, and over a period of 100 minutes, waterglass was metered in at a rate of 3.93 kg/min, and sulfuric acid was metered in at a rate of 0.526 kg/min with stirring. The rate of metering of sulfuric acid was corrected if appropriate so that during the entire precipitation time a pH of 8.5 was maintained. Thereafter the waterglass feed was shut off, and with the same rate of metering of sulfuric acid the precipitation suspension was acidified to a pH of 3. The precipitation suspension then had a solids content of 54 g/l.

The resulting suspension was filtered with a membrane filter press and the filtercake washed with deionized water until the wash water was found to have a conductivity of <1 mS/cm. The filtercake had a solids content of <20%.

Before drying by means of a spray drier, the filtercake was redispersed with deionized water to a solids content of 8%-13%, during which it was not exposed to any strong shearing forces. The metering of the liquefied filtercake into the spray drier took place in such a way that the temperature measured at the drier outlet was approximately 150° C.

The spray-dried material was subjected to preliminary grinding by way of a mechanical beater mill to an average particle size of 10-12 μm. Following this preliminary grinding, the material was very finely ground on a steam-operated fluid-bed opposed-jet mill in accordance with FIGS. 1, 2a and 3a at an overpressure of 38 bar. Details of the grinding system (mill) used and of the grinding technique used can be taken from the description above and also from FIGS. 1, 2a and 3a.

In preparation for the actual grinding with superheated steam, a fluid-bed opposed-jet mill as shown in FIG. 1, with an integrated dynamic pneumatic classifier as shown in FIGS. 2a and 3a, was first heated via the two heating nozzles 5a (of which only one is depicted in FIG. 1), which were charged with hot compressed air at 10 bar and 160° C., until the mill exit temperature was about 105° C.

Connected downstream of the mill, for the separation of the ground material, was a filter system (not shown in FIG. 1) whose filter housing was heated in its lower third indirectly, via attached heating coils, by means of 6 bar saturated steam, likewise for the purpose of preventing condensation. All of the apparatus surfaces in the region of the mill, the separation filter, and the supply lines for steam and hot compressed air had special insulation.

After the heating temperature was reached, the supply of hot compressed air to the heating nozzles was shut off and the charging of the three grinding nozzles with superheated steam (37.9 bar (abs), 325° C.), as the grinding medium, was commenced.

In order to protect the filter medium used in the separation filter and also in order to set a defined level of residual water in the ground material (see table 1), water was introduced in the starting phase and during grinding into the grinding chamber of the mill, via a two-fluid nozzle operated with compressed air, as a function of the mill exit temperature.

The configuration and operating parameters of the mill that were used were as follows: diameter of the grinding nozzles=2.5 mm, nozzle type=Laval, number of nozzles=3 units; internal mill pressure=1.306 bar (abs.), entry pressure of the grinding medium=37.9 bar (abs.), entry temperature of the grinding medium=325° C., mill exit temperature of the grinding medium=149.8° C., classifier speed=3500 min−1, classifier flow=54.5 A %, exit port diameter (immersed pipe diameter)=100 mm.

Product feed was commenced when the abovementioned process parameters were constant. The feed quantity was regulated as a function of the classifier flow which cames about. The classifier flow regulated the feed quantity such that it was not possible to exceed approximately 70% of the nominal flow.

Functioning as an introduction member (4) here was a speed-regulated bucket wheel which metered the feed material from a reservoir container via a cyclical lock, which served as a barometric endpoint, into the grinding chamber, which was at superatmospheric pressure.

The coarse material was comminuted in the expanding steam jets (grinding gas). Together with the depressurized grinding gas, the product particles ascended in the center of the mill vessel to the classifying wheel. Depending on the classifier speed and grinding steam quantity which were set, the particles whose fineness were sufficient entered along with the grinding steam into the fines exit, and from there they passed into the downstream separating system, while particles which were too coarse passed back into the grinding zone and were subjected to a repeat comminution. The discharge of the separated fines from the separation filter into the subsequent silo storage and bagging operation took place by means of a bucket-wheel lock.

The grinding pressure of the grinding gas that prevailed at the grinding nozzles, and the resulting volume of grinding gas, in conjunction with the speed of the dynamic paddle wheel classifier, determined the fineness of the particle-size distribution function and also the upper particle-size limit.

The material was ground to the particle size defined in table 1 by means of the d90 value and by the fraction of particles <1 μm.

Subsequently the material was treated in a fluidized-bed reactor (expanded fluidized bed height approximately 1.5 m, fluidized-bed diameter approximately 0.5 m). For this purpose the following conditions were observed:

First of all, 5 kg of the ground powder were introduced into the fluidized-bed reactor with fluidizing base. The fluidizing base was traversed by a gas mixture comprising dry nitrogen and dry air. These two gases were metered prior to their entry into the reactor in such a way that a resulting oxygen content of 6% by volume was not exceeded and in such a way as to give a fluidization velocity in the reactor of 0.05 m/s. The reactor was then heated from room temperature to 600° C. The flow rates of the fluidizing gas were regulated during the heating phase such that the fluidization velocity in the reactor remained constant at 0.05 m/s.

After 600° C. was reached, a preheated gas mixture of steam and nitrogen was fed into the reactor for a period of 3 hours. The two components were mixed so as to set a steam concentration of 90% and a nitrogen content of 10%. The gas volumes were adapted so that, again, a fluid gas velocity of 0.05 m/s was obtained.

Thereafter the addition of steam was interrupted and for 30 minutes pure nitrogen at 600° C. was passed through the fluidized-bed reactor.

Then the material was cooled to room temperature in the dry nitrogen stream and discharged from the reactor. In the cooling phase, particular care was taken to ensure that no steam was present.

The material was then acidified to a pH=4.3 using gaseous HCl.

For this purpose the material was divided into fraction A and fraction B.

Fraction A was acidified with gaseous HCl. This was done by gassing 20 g of silica at room temperature for 2 minutes (flow rate approximately 250 ml/h).

The material was then flushed with nitrogen for 10 minutes.

Following this treatment the material had a pH of 3.7.

Material from fraction B was then added to the acidified fraction A until a pH of 4.3 was obtained.

The procedure of acidifying and mixing was repeated until the desired sample quantity was reached.

The chemicophysical data of example 1 are listed in Table 1.

Comparative Example

As the comparative example the precipitated silica according to example 2 of DE 102006024591 was used.

TABLE 1

| Product | | Example 1 | Comparative Example |
|---|---|---|---|
| BET | $m^2/g$ | 142 | 142 |
| CTAB | $m^2/g$ | 163 | 157 |
| DBP | g/100 g | 286 | 295 |
| pH | — | 4.3 | 6.0 |
| Loss on drying | % | 0.8 | 0.5 |
| Loss on ignition | % | 0.9 | 0.9 |
| $SiOH_{isolated}$ absorbance ratio | | 3.19 | 3.17 |
| Silanol group density | $SiOH/nm^2$ | 1.92 | 1.988 |

TABLE 1-continued

| Product | | Example 1 | Comparative Example |
|---|---|---|---|
| Modified tapped density | g/l | 23 | 21 |
| Fraction of fine particles <1 μm[1] | % | 74.79 | 66.7 |
| Type of particle distribution | | bimodal | bimodal |
| $D_{90}$ value of volume-based particle distribution | μm | 5.03 | 5.87 |
| Attitude to water | | hydrophilic | hydrophilic |

[1] with 5 minutes of ultrasound at 300 watts

Example 3

Performance Tests 3.1 Preparation of Acetate-Crosslinking RTV-1K Silicone Sealants with Precipitated Silicas The amounts required for preparing the formulation below are indicated in Table 2. In the course of preparation, cooling with mains water was carried out so that the formulation did not undergo warming substantially beyond room temperature. Preparation took place at room temperature and at a relative humidity of 40% to 60%.

A planetary dissolver (from H. Linden, type LPMD 2SP) equipped with a 2 l stirring vessel with jacket, cooling water connection and independently controllable planetary drive and dissolver drive was charged with silicone polymer, plasticizer (silicone oil) and crosslinker and this initial charge was homogenized for 1 minute at a speed of 50 $min^{-1}$ (planetary drive) and 500 $min^{-1}$ (dissolver drive). Then the catalyst was added and the batch was homogenized for 15 minutes under an $N_2$ atmosphere with the same planetary and dissolver drive speeds. Thereafter in the comparative example the stabilizer and the precipitated silica, in the inventive example just the precipitated silica, were incorporated, again at the same speeds. As soon as the precipitated silica was fully wetted a vacuum of approximately 200 mbar was applied and dispersion took place for 10 minutes at 100 $min^{-1}$ of the planetary stirrer mechanism and 2000 $min^{-1}$ of the dissolver.

Immediately after the end of the dispersing operation the stirring vessel was flushed with nitrogen. Using a drum press, the sealant was dispensed as quickly as possible into aluminum tubes (cartridges).

TABLE 2

Formulation for preparing a one-component room-temperature crosslinking (RTV-1K) silicone sealant (acetoxy system)

| Formulation constituent [general name] | Chemical identification | Product name and manufacturer | Crosslinker 42 g Filling level 12% $SiO_2$ | | Crosslinker 30 g Filling level 12% $SiO_2$ | |
|---|---|---|---|---|---|---|
| | | | Initial mass [g] | Fraction [%] | Initial mass | Fraction |
| Silicone polymer OH-terminated silicone polymer (viscosity = 50 000 mPa * s) | α,ω-hydroxydimethylsiloxy-polydimethylsiloxane | Silopren ® E 50 GE Bayer Silicones GmbH & Co. KG | 468.00 | 58.6 | 468.00 | 60.1 |
| Plasticizer Non-functional polydimethylsiloxane (silicone oil, viscosity = 1000 mPa * s | α,ω-trimethylsiloxypoly-dimethylsiloxane | Oil M 1000 GE Bayer Silicones GmbH & Co. KG | 184.50 | 23.1 | 184.50 | 23.7 |
| Active filler Precipitated silica | precipitated silica | Example 1 Comparative Example | 95.79 | 11.99 | 95.79 | 12.3 |
| Crosslinker | ethyltriacetoxysilane | Ethyltriacetoxysilane ABCR GmbH & Co. KG | 42.00 | 5.3 | 30.00 | 3.9 |

TABLE 2-continued

Formulation for preparing a one-component room-temperature
crosslinking (RTV-1K) silicone sealant (acetoxy system)

| Formulation constituent [general name] | Chemical identification | Product name and manufacturer | Crosslinker 42 g Filling level 12% SiO$_2$ | | Crosslinker 30 g Filling level 12% SiO$_2$ | |
|---|---|---|---|---|---|---|
| | | | Initial mass [g] | Fraction [%] | Initial mass | Fraction |
| Stabilizer | | TP 3556 GE Bayer Silicones GmbH & Co. KG, | 8.00 | 1.0 | 0.00 | 0.00 |
| Catalyst | Dibutyltin diacetate | TEGOKAT ® 233 Goldschmidt TIB GmbH | 7 drops 0.01 g | 0.001 | 7 drops 0.01 g | 0.001 |
| Total amounts | | | 798.3 | 100 | 778.3 | 100 |

3.2 Determining the Rheological Properties and the Storage Stability of RTV-1K Sealants The sealants prepared in accordance with Example 3, section 1, "Preparation of acetate-crosslinking RTV-1K silicone sealants with precipitated silicas" were stored prior to testing for at least 24 hours in a controlled-climate chamber at 23° C./50% relative humidity.

To test the storage stability of the sealants, two tubes were stored for 35 days in a controlled-climate chamber at 23° C. at 50% relative humidity and were tested after storage periods respectively of 0, 7, 14, 21, 28 and 35 days. Additionally, one further tube was stored in a forced-air oven at 50° C. for 35 days and tested after 1, 7, 14, 21, 28 and 35 days of storage.

The rheological properties were determined using a Haake RheoStress 1 rheometer (controlled via PC using the RheoWin Pro program). The operation of the instrument and of the software is described in detail in the Haake operating instructions. For the measurement it was necessary to use a die having a diameter of 35 mm, and the measuring-plate attachment MPC 35. Measurement was conducted under the following conditions:

| | |
|---|---|
| Slot distance between die and measuring-plate attachment: | 0.5 mm |
| Measurement temperature: | 23° C. |
| Measurement range (shear rate): | 0-10 1/s |
| Number of measurement points: | 400 |

The measurement points were plotted in a diagram which showed the shear rate γ on the x axis and the shear stress τ on the y axis. At a shear rate of 10 1/s the shear stress was read off and from this figure the viscosity η at 10 1/s was calculated using η=τ/γ. Two tubes were measured, with at least three measurements being carried out per tube. From the six individual results the highest and lowest values were discarded. The remaining four results were used to calculate the average value.

For the determination of the yield point the Casson model was used. The data basis for calculating the Casson flow curve was the range from 0.2 to 2 1/s from the shear rate/shear stress diagram. The following relationship was defined:

$$\tau = f\left(\frac{\circ}{\gamma}\right)$$

The value on the y axis at which it intersected the flow curve calculated by the method of Casson was reported as the Casson yield point.

The determination both of the viscosity at 10 1/s and of the Casson yield point was made automatically under the conditions indicated above by the RheoWin Pro software.

3.3 Assessing the Results

The consistency of silicone rubber formulations into which the precipitated silicas of the invention were incorporated was assessed using the measurement results for the Casson yield point and for the viscosity at a shear rate of 1/10 (Table 3).

By consistency is meant the rheological behavior of an RTV-1K silicone sealant. Consistency may be said to be good if silicone rubber applied to a vertical surface adhered to that surface without running over 24 h in the course of curing. Adequate consistency may be recognized from a viscosity of ≥100 Pas and a yield point of ≥90 Pa. The values for the Casson yield point of the silicone rubber formulations of Examples 3a and 3b are situated within a comparably good range, despite the fact that the silicone rubber formulation 3a contains an amount of crosslinker lower by 30% and also contains no stabilizer. Consequently formulations comprising the precipitated silica of the invention remain in the form in which they were applied and do not show any propensity to run. This may also be confirmed by the viscosity figures. Here the precipitated silicas of the invention exhibit a significantly improved viscosity, i.e. higher viscosity, than the comparative examples.

The storage stability, i.e. the change in rheological properties such as yield point and viscosity and also the negative cure behavior in the tube over time, is shown in Tables 4 and 5. Consideration was given here both to the storage at room temperature and to the storage at elevated temperature (50° C.).

Tables 4 and 5 demonstrate the low amount of crosslinker required when the precipitated silica of the invention was used in comparison to the precipitated silica of the comparative example. It was possible to reduce the amount of crosslinker by about 30%. As well as the low amount of crosslinker, of only 30 g to 95.79 g of precipitated silica, it was possible when using the precipitated silica of the invention, in contrast to the comparative example, to do without the use of a stabilizer as well. Thus Table 3 shows that the viscosity of the formulation with the precipitated silica of the invention is much better than that of the comparative example, while the yield point in both examples is at a comparable, very good, level.

In spite of the low quantity of crosslinker and the absence of the stabilizer, the formulations with the acidic precipitated silica of the invention exhibited very good storage behavior, which is also manifested in the constancy of viscosity and yield point for the formulations stored at room temperature and at 50° C. for 35 days (Tables 4 and 5).

Despite the absence of a stabilizer, the samples of the inventive example cured properly even after 35 days of storage at 50° C. Precipitated silicas with higher pH levels, as shown in the comparative example, in contrast, required a stabilizer and higher quantities of crosslinker in order to cure properly even after a prolonged storage period at elevated temperature.

Numerous modifications and variations on the present invention are possible in light of the above teachings. It is therefore to be understood that within the scope of the appended claims, the invention may be practiced otherwise than as specifically described herein.

9 inlet opening or inlet nozzle
10 grinding jet
11 heat source
12 heat source
13 supply pipe
14 thermal insulation jacket
15 inlet
16 outlet
17 center of grinding chamber
18 reservoir or generating means
19 pipe installations
20 exit port (immersed pipe)
21 classifier housing
22 top housing part
23 bottom housing part
24 circumferential flange
25 circumferential flange
26 articulated joint

TABLE 3

Consistency testing

| Example | Silica used from | Loading [%] | Crosslinker content [g] | Stabilizer GE TP 3556 [g] | Casson Yield Point [Pa] | Viscosity at 10 1/s [Pa * s] |
|---|---|---|---|---|---|---|
| 3a | Example 1 | 12 | 30.0 | 0.0 | 241 | 159 |
| 3b | Comparative Example | 12 | 42.0 | 8.0 | 260 | 118 |

TABLE 4

Rheology over 35 days at RT

| Example | Silica used from | Loading in [%] | Crosslinker content in [g] | Stabilizer GE TP 3556 [g] | Temp. in [° C.] | Period in [d] | Visc. at 10 1/s in [Pa * s] | Casson Yield Point in [Pa] |
|---|---|---|---|---|---|---|---|---|
| 3a | Example 1 | 12 | 30 | 0.0 | 23 | 0 | 159 | 241 |
|  |  |  |  |  |  | 35 | 163 | 235 |
| 3b | Comparative Example | 12 | 42 | 8.0 | 23 | 0 | 118 | 260 |
|  |  |  |  |  |  | 35 | 124 | 270 |

TABLE 5

Rheology over 35 days at 50° C.

| Example | Silica used from | Loading in [%] | Crosslinker content in [g V] | Stabilizer GE TP 3556 [g] | Temp. in [° C.] | Period in [d] | Visc. at 10 1/s in [Pa * s] | Casson Yield Point in [Pa] |
|---|---|---|---|---|---|---|---|---|
| 3a | Example 1 | 12 | 30 | 0.0 | 50 | 0 | 162 | 259 |
|  |  |  |  |  |  | 35 | 159 | 300 |
| 3b | Comparative Example | 12 | 42 | 8.0 | 50 | 0 | 113 | 252 |
|  |  |  |  |  |  | 35 | 112 | 279 |

LIST OF REFERENCE NUMERALS FOR FIGS. 1, 2, 2a, 3 AND 3a 1 jet mill
2 cylindrical housing
3 grinding chamber
4 feed for material to be ground
5 grinding jet inlet
5a heating nozzles
6 product outlet
7 pneumatic classifier
8 classifying wheel
8a classifier gap
27 arrow
28 classifying chamber housing
28a carrying arms
29 discharge cone
30 flange
31 flange
32 coverplate
33 coverplate
34 blade
35 classifying wheel shaft
35a Pivot bearing
36 top machined plates
37 bottom machined plate 38 end section of housing
39 product feed port
40 axis of rotation
41 exit chamber
42 top coverplate
43 removable lid
44 carrying arms
45 conical annular housing
46 intake filter
47 perforated plate
48 fines discharge pipe
49 deflection cone
50 classifying air entry coil
51 coarse product discharge
52 flange
53 flange
54 dispersion zone
55 flange machined (beveled) at the inside edge, and lining
56 replaceable protection pipe
57 replaceable protection pipe
58 fines exit/outlet
59 blade ring

The invention claimed is:

1. A sealant comprising:
a one component room-temperature vulcanizing silicone rubber composition (RTV-1K); and
a precipitated silica; wherein
the precipitated silica has physiochemical properties comprising:
an $SiOH_{isolated}$ absorbance ratio of from 1.5 to 10,
a silanol group density of 1 to 3.0 $SiOH/nm^2$,
a modified tapped density of 1 to 50 g/l, and
a pH of 3 to 5, wherein the pH is measured as a aqueous suspension of 5.00 g of the precipitated silica in 100 ml. of deionized water, and
wherein the sealant is free of a stabilizer and is storage-stable for 35 days when stored at 50° C.

2. The sealant according to claim 1, further comprising a crosslinking system selected from the group consisting of an acetoxy-crosslinking, an alkoxy-crosslinking and an oxime-crosslinking system.

3. The sealant of claim 1, wherein
the pH of the precipitated silica is from 3 to less than 4.

4. The sealant of claim 1, wherein
a BET surface area of the precipitated silica is from 50-600 $m^2/g$,
a CTAB surface area of the precipitated silica is from 50-350 $m^2/g$, and
a DBP (anhydrous) value of the precipitated silica is from 150-400 g/100 g.

5. The sealant of claim 1, wherein
30% to 100% of the particles in a volume-based particle distribution curve of the precipitated silica are less than 1 μm and/or
a d90 value of the volume-based particle distribution curve is not greater than 0.001-10 μm.

6. The sealant of claim 1, wherein a particle distribution curve of the precipitated silica is bimodal.

7. The sealant of claim 1, wherein
a loss on ignition of the precipitated silica is is 0.1%-3.0% by weight and/or
a loss on drying of the precipitated silica is 0.1%-3.0% by weight.

8. The sealant of claim 1, wherein
the precipitated silica is hydrophilic.

9. A process for preparing the precipitated silica of the sealant according to claim 1, comprising:

1) reacting at least one silicate with at least one acidifier;
2) filtering and washing the resulting precipitated silica;
3) drying the resulting precipitated silica or filtercake;
4) optionally grinding the precipitated silica obtained after 3);
5) heat-treating the dried and/or ground precipitated silica; and
6) optionally grinding the precipitated silica obtained after 5);
wherein
after 3) and/or 4) and/or 5) and/or 6) at least one acidifier is added to obtain the precipitated silica having a pH of 3-5, when the pH is measured as a aqueous suspension of 5.00 g of the precipitated silica in 100 ml. of deionized water.

10. The process according to claim 9, wherein the reacting at least one silicate with at least one acidifier comprises:
1a) preparing an initial charge of water or of water and at least one silicate and/or a silicate solution, wherein the pH of the resulting initial charge is between 5 and 10 and the temperature of the initial charge is between 80 and 100° C.;
1b) metering at least one silicate and/or a silicate solution and at least one acidifier into the initial charge from 1a) with stirring at 80 to 100° C. until the solids content of the precipitation suspension reaches a level which leads to the solids content which is to be reached in 1c);
1c) adding an acidifier at a temperature of the precipitation suspension of 80 to 100° C., to lower the pH of the precipitation suspension to 2 to 6;
wherein
a solids content of the precipitation suspension at the end of the addition of the acidifier is between 30 and 70 g/l.

11. The process according to claim 10, wherein during the metering at least one silicate and/or a silicate solution and at least one acidifier into the initial charge from 1a) the pH is held constant at a level between 7 and 10.

12. The process according to claim 9, wherein in the optional grinding, the grinding parameters are selected to obtain a ground product having a fine-particle fraction of 5% to 100% in the range <1 μm of the volume-based particle distribution and/or a d90 value of the volume-based particle distribution curve of between 0.001 and 10 μm.

13. The process according to claim 12, wherein the grinding takes place in a fluid-bed opposed-jet mill.

14. The process according to claim 13, wherein steam is an operational medium in the fluid-bed opposed-jet mill.

15. The process according to claim 12, further comprising:
before the actual operation with the operational medium, heating the grinding chamber and/or at the mill outlet to a temperature that is higher than the dew point of the vapor and/or operational medium,
wherein
the grinding is carried out in a grinding apparatus comprising a jet mill, and the grinding phase in the mill is an operational medium selected from the group consisting of a gas, steam, and a mixture of a gas and steam.

16. The process according to claim 9, wherein the heat treatment of the dried and/or precipitated silica is carried out in a fluidized-bed, fluid-bed or rotary-tube reactor.

17. The process according to claim 16, wherein the heat treatment is carried out in a fluidized-bed reactor and further comprising:
5a) introducing the precipitated silica into the fluidized-bed reactor;

5b) preheating the reactor to 300 to 800° C., the reactor being traversed at the same time by a flow of inert gas and/or nitrogen/air mixture in such a way as to produce a fluidization velocity of 0.02 to 0.06 m/s;

5c) feeding in a gas mixture I comprising steam and an inert gas, or a gas mixture II comprising steam, an inert gas and air, at 300 to 800° C. for a period of 0.25 to 6 h, the gas mixture traversing the reactor with a fluidization velocity of 0.02 to 0.06 m/s, and the gas mixtures I and II having a steam concentration of 10 to 95% by volume and in the case of gas mixture II an oxygen content of 0.01% to 21% by volume;

5d) interrupting the addition of vapor and expelling the vapor by adding an inert gas and/or an inert gas/air mixture at 300 to 800° C., the gas or gas mixture traversing the reactor with a fluidization velocity of 0.02 to 0.06 m/s, and, if using an inert gas/air mixture, said mixture having an oxygen content of 0.01% to 21% by volume; and 5e) cooling the heat-treated precipitated silica to room temperature in a dry process atmosphere, where, if using an inert gas/air mixture, said mixture has an oxygen content of 0.01% to 21% by volume.

18. The process according to claim 9, wherein the at least one acidifier is a gaseous acidifier selected from the group consisting of HCl, HBr, an oxide of nitrogen, vaporized $SO_3$, and vaporized $SOCl_2$.

19. The process according to claim 18, further comprising flushing the precipitated silica with an inert gas and/or dry air after the acidification.

20. The process according to claim 9, wherein
the precipitated silica obtained after 5 and/or 6 is divided into a fraction A and fraction B,
the fraction A is acidified to pH of 2 to 4.5 using a gaseous acidifier, and thereafter the acidified fraction A is mixed with fraction B to obtain the precipitated silica having a pH of 3-5, when the pH is measured as a aqueous suspension of 5.00 g of the precipitated silica in 100 ml. of deionized water.

21. The process according to claim 20, wherein the acidified fraction A is flushed with an inert gas and/or dry air after the acidification.

22. A method for the preparation of the sealant of claim 1, comprising adding a precipitated silica to a room-temperature vulcanizing (RTV-1K) silicone rubber;
wherein
no stabilizer is added to the sealant,
the precipitated silica has physiochemical properties comprising:
an $SiOH_{isolated}$ absorbance ratio of from 1.5 to 10,
a silanol group density of 1 to 3.0 $SiOH/nm^2$,
a modified tapped density of 1 to 50 g/l, and
a pH of 3 to 5, wherein the pH is measured as a aqueous suspension of 5.00 g of the precipitated silica in 100 ml. of deionized water.

23. The method according to claim 22, further comprising adding a crosslinking system to the sealant, wherein the crosslinking system is selected from the group consisting of an acetoxy-crosslinking, an alkoxy-crosslinking and an oxime-crosslinking system.

24. An industrial method comprising applying the sealant according to claim 1 to a substrate, wherein the industrial method is one selected from the group consisting of sealing a joint in a building, adhesively attaching parts of a automobile and coating a textile fabric.

* * * * *